(12) United States Patent
Takahashi et al.

(10) Patent No.: US 8,098,550 B2
(45) Date of Patent: Jan. 17, 2012

(54) INFORMATION RECORDING MEDIUM, INFORMATION RECORDING METHOD, INFORMATION RECORDING APPARATUS, INFORMATION REPRODUCING METHOD AND INFORMATION REPRODUCING APPARATUS INCLUDING WRITING INFORMATION ON REWRITABLE INFORMATION RECORDING MEDIUM

(75) Inventors: Yoshihisa Takahashi, Osaka (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/773,039

(22) Filed: May 4, 2010

(65) Prior Publication Data

US 2010/0315916 A1 Dec. 16, 2010

Related U.S. Application Data

(60) Provisional application No. 61/177,002, filed on May 11, 2009.

(51) Int. Cl.
*G11B 15/52* (2006.01)
(52) U.S. Cl. .................... 369/47.14; 369/53.17
(58) Field of Classification Search .......... None
See application file for complete search history.

(56) References Cited

U.S. PATENT DOCUMENTS

| 5,715,221 A | 2/1998 | Ito et al. | |
| 6,741,534 B1* | 5/2004 | Takahashi et al. | 369/47.14 |
| 2003/0179669 A1 | 9/2003 | Takahashi et al. | |
| 2004/0174782 A1 | 9/2004 | Lee et al. | |
| 2004/0174785 A1* | 9/2004 | Ueda et al. | 369/47.14 |
| 2007/0094550 A1 | 4/2007 | Ai | |

FOREIGN PATENT DOCUMENTS

| JP | 04-103082 | 4/1992 |
| JP | 05-135502 | 6/1993 |
| JP | 2003-346429 | 12/2003 |
| JP | 3858050 | 9/2006 |
| JP | 2006-344375 | 12/2006 |

OTHER PUBLICATIONS

International Search Report for corresponding International Application No. PCT/JP2010/003064 mailed Aug. 17, 2010.
Form PCT/ISA/237 for corresponding International Application No. PCT/JP2010/003064 dated Aug. 17, 2010.
Co-pending U.S. Appl. No. 12/988,648, filed Oct. 20, 2010.

* cited by examiner

*Primary Examiner* — Paul Huber
(74) *Attorney, Agent, or Firm* — Renner, Otto, Boisselle & Sklar, LLP

(57) ABSTRACT

If a defective cluster in a spare area is managed with a defect entry, the size of a DFL will increase as the size of the spare area increases with an increase in the number of recording layers stacked in a disc. An information recording medium according to the present invention has pointer information indicating the location of the next available cluster in each spare area, and restricts the direction in which the spare area is used. Also, a defect entry indicating a defective cluster in the spare area is registered with the DFL. Thus, even if the size of the spare area 15 increases, the size of the DFL 21 can be kept relatively small. Furthermore, even after physical reformatting is done, a defective cluster, if any, in the spare area 15 can still be recognized as a defect and the control operation can be performed so that a replacement cluster is not reallocated to that defective cluster (i.e., the defective cluster is not used).

5 Claims, 19 Drawing Sheets

| FIRST STATUS FIELD 31a | SECOND STATUS FIELD 31c | DEFECT ATTRIBUTE (NAME) | NUMBER OF CLUSTERS COVERED |
|---|---|---|---|
| 0000 | 0000 | RAD0 | ONE |
| 1000 | 0000 | RAD1 | ONE |
| 0001 | 0000 | NRD | ONE |
| 0010 | 0100 | SPR(RDE) | ONE |
| 0100 | 0000 | PBA | ONE OR MORE |
| 0100 | 0100 | PBA(RDE) | ONE OR MORE |
| 0111 | 0000 | UNUSE | ONE |

| SECOND STATUS FIELD 31c | DEFINITION |
|---|---|
| 0000 | SECOND STATUS FIELD IS NOT USED |
| 0001 | FIRST CLUSTER OF CONTINUOUS DEFECTIVE AREA |
| 0010 | LAST CLUSTER OF CONTINUOUS DEFECTIVE AREA |
| 0100 | PHYSICAL REFORMATTING IS DONE ON DEFECTIVE CLUSTER |
| OTHERS | (UNDEFINED) |

(B)

| FIRST STATUS FIELD 31a | SECOND STATUS FIELD 31c | DEFECT ATTRIBUTE (NAME) | NUMBER OF CLUSTERS COVERED |
|---|---|---|---|
| 0000 | 0000 | RAD0 | ONE |
|  | 0001 | CRD0(TOP) | ONE OR MORE |
|  | 0010 | CRD0(END) | ONE OR MORE |
| 1000 | 0000 | RAD1 | ONE |
|  | 0001 | CRD1(TOP) | ONE OR MORE |
|  | 0010 | CRD1(END) | ONE OR MORE |
| 0001 | 0000 | NRD | ONE |
| 0010 | 0100 | SPR(RDE) | ONE |
| 0100 | 0000 | PBA | ONE OR MORE |
|  | 0100 | PBA(RDE) | ONE OR MORE |
| 0111 | 0000 | UNUSE | ONE |

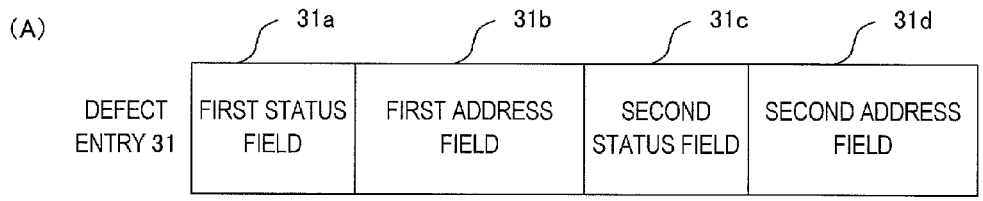

DEFECT ENTRY 31 | FIRST STATUS FIELD (31a) | FIRST ADDRESS FIELD (31b) | SECOND STATUS FIELD (31c) | SECOND ADDRESS FIELD (31d)

(B)

| FIRST STATUS FIELD 31a | DEFINITION |
|---|---|
| 0000 (RAD0) | REPLACEMENT CLUSTER HAS BEEN ALLOCATED TO DEFECTIVE CLUSTER AND DATA OF THE DEFECTIVE CLUSTER HAS BEEN WRITTEN ON THE REPLACEMENT CLUSTER |
| 1000 (RAD1) | REPLACEMENT CLUSTER HAS BEEN ALLOCATED TO DEFECTIVE CLUSTER BUT DATA OF THE DEFECTIVE CLUSTER HAS NOT BEEN WRITTEN ON THE REPLACEMENT CLUSTER YET |
| 0001 (NRD) | NO REPLACEMENT CLUSTER HAS BEEN ALLOCATED TO DEFECTIVE CLUSTER YET |
| 0010 (SPR) | INVALIDATED DFL ENTRY (SECOND ADDRESS FIELD INDICATES LOCATION TO BE REPLACEMENT) |
| 0100 (PBA) | AREA THAT MAY HAVE DEFECTIVE CLUSTER (FIRST AND SECOND ADDRESS FIELDS INDICATE TOP OF DEFECTIVE CLUSTER AND SIZE OF THE AREA, RESPECTIVELY) |
| 0111 (UNUSE) | DEFECTIVE CLUSTER IN SPARE AREA (SECOND ADDRESS FIELD INDICATES DEFECTIVE CLUSTER LOCATION) |
| OTHERS | (UNDEFINED) |

(C)

| SECOND STATUS FIELD 31c | DEFINITION |
|---|---|
| 0000 | SECOND STATUS FIELD IS NOT USED |
| 0100 | PHYSICAL REFORMATTING IS DONE ON DEFECTIVE CLUSTER |
| OTHERS | (UNDEFINED) |

FIG.18

| FIRST STATUS FIELD 31a | SECOND STATUS FIELD 31c | DEFECT ATTRIBUTE (NAME) | NUMBER OF CLUSTERS COVERED |
|---|---|---|---|
| 0000 | 0000 | RAD0 | ONE |
| 1000 | 0000 | RAD1 | ONE |
| 0001 | 0000 | NRD | ONE |
| 0010 | 0000 | SPR | ONE |
| 0010 | 0100 | SPR(RDE) | ONE |
| 0100 | 0000 | PBA | ONE OR MORE |
| 0100 | 0100 | PBA(RDE) | ONE OR MORE |
| 0111 | 0000 | UNUSE | ONE |

INFORMATION RECORDING MEDIUM, INFORMATION RECORDING METHOD, INFORMATION RECORDING APPARATUS, INFORMATION REPRODUCING METHOD AND INFORMATION REPRODUCING APPARATUS INCLUDING WRITING INFORMATION ON REWRITABLE INFORMATION RECORDING MEDIUM

This application claims priority under 35 U.S.C. §119 to U.S. Provisional Application No. 61/177,002, filed May 11, 2009, which is incorporated herein by reference in its entirety.

BACKGROUND OF THE INVENTION

1. Field of the Invention

The present invention relates to a method and apparatus for reading and writing from/to an information recording medium with a defect management function. The present invention can be used particularly effectively in an optical disc drive for reading and writing from/to a rewritable optical disc on which information can be rewritten a number of times.

2. Description of the Related Art

Recently, various removable information recording media with huge storage capacities and disc drives for handling such media have become immensely popular.

Examples of known removable information recording media with big storage capacities include optical discs such as DVDs and Blu-ray Discs (which will also be referred to herein as "BDs"). An optical disc drive performs a read/write operation by making tiny pits on a given optical disc using a laser beam, and therefore, can be used effectively to handle such removable information recording media with huge storage capacities. Specifically, a red laser beam is used for DVDs, while a blue laser beam, having a shorter wavelength than the red laser beam, is used for BDs, thereby making the storage density and storage capacity of BDs higher and greater than those of DVDs.

However, as an optical disc is a removable information recording medium, there will be some defect on its recording layer due to the presence of dust or a scratch. That is why it has become a more and more common measure to take for an optical disc drive for reading and writing from/to an optical disc to carry out a defect management to ensure the reliability of the data read or written (see Patent Document No. 1 (Japanese Patent Application Laid-Open Publication No. 2003-346429), for example).

FIG. 1 illustrates a normal layout of various areas on an optical disc. The disklike optical disc 1 has a huge number of spiral tracks 2, along which a great many subdivided blocks 3 are arranged.

In this case, those tracks 2 may have a width (i.e., a track pitch) of 0.32 μm in a BD, for example. Blocks 3 are not only units of error correction but also the smallest units of read/write operations. As for a DVD, one block is called an "ECC" with a size of 32 kilobytes. As for BDs, on the other hand, one block is called a "cluster" with a size of 64 kilobytes. Converting them into sectors, which are the smallest data units for an optical disc, one ECC is equal to 16 sectors and one cluster is equal to 32 sectors. It should be noted that when a "cluster" is mentioned in the rest of the description, it will always be synonymous with the block 3.

Also, the recording area on the optical disc 1 is roughly classified into a lead-in area 4, a data area 5 and a lead-out area 6. User data is supposed to be read from, and written on, the data area 5. The lead-in area 4 and the lead-out area 6 function as margins that allow the optical head (not shown) to get back on tracks even if the optical head has overrun while accessing an end portion of the data area 5. That is to say, these areas 4 and 6 function as "rims" so to speak.

FIG. 2 shows the arrangement of respective areas on a rewritable optical disc with only one recording layer.

The data area 5 is made up of a user data area 14 from/on which user data is read or written and a spare area 15, which is provided in advance as clusters that will replace clusters with defective sectors in the user data area 14. The clusters of the former type will be referred to herein as "replacement clusters". This spare area 15 is provided for the only recording layer (L0 layer) of the disc and is located closer to the inner edge of the disc, and therefore, called "Inner Spare Area Layer 0 (which will be referred to herein as "ISA0").

As areas to store defect management information for defective blocks on the optical disc 1, the lead-in area 4 has first and second defect management information areas 10 and 11 (which will be referred to herein as "DMA #1" and "DMA #2", respectively) and the lead-out area 6 has third and fourth defect management information areas 12 and 13 (which will be referred to herein as "DMA #3" and "DMA #4", respectively). DMA #1 through #4 are arranged in their own areas and store quite the same pieces of information redundantly, which is done to prepare for a situation where any of the DMA #1 through #4 has gone defective itself. That is to say, even if information can no longer be retrieved from one of these four DMAs properly, the defect management information can still be acquired as long as there is at least one DMA from which information can be retrieved properly.

Each of these DMAs #1 through #4 includes a disc definition structure 20 (which will be abbreviated herein as "DDS") and a defect list 21 (which will be abbreviated herein as "DFL").

The DDS 20 contains various kinds of information including location information (such as information about the location of the DFL 21) and information about the spare area 15 (such as information about its size).

FIG. 16 illustrates the data structure of the DFL 21 of a rewritable optical disc with only one recording layer.

The DFL 21 consists of a DFL header 30, zero or more defect entries 31 (a situation where there are (n+1) defect entries 31 (where n is an integer that is equal to or greater than zero) is shown in FIG. 16), and a DFL terminator 32. That is to say, if no defective clusters have been detected, the DFL 21 consists of only the DFL header 30 and the DFL terminator 32.

The DFL header 30 contains a DFL identifier 40, which is identification information indicating that this piece of information is DFL, a first piece of number of times of update information 41 indicating how many times this DFL 21 has been updated so far, and number of defective entries information 42 indicating how many defective entries 31 there are in this DFL 21.

The DFL terminator 32 contains a DFL terminator identifier 50 indicating that this is a piece of information about the terminal location of the DFL, and a second piece of number of times of update information 51 indicating how many times this DFL 21 has been updated so far. The first and second pieces of number of times of update information 41 and actually have the same value. The same piece of information is stored in this manner at the head and tail of the DFL 21 in order to keep the DFL 21 retrievable safely even if the DFL 21 could not be updated properly due to instantaneous disconnection of power or any other unexpected event that could happen while the DFL 21 is being updated.

The defect entries 31 provide information about the defective clusters that have been detected in the data area 5. Each of these defect entries manages defective clusters according to multiple types (or attributes)(see Patent Document No. 2 (Japanese Patent No. 3858050), for example).

FIGS. 17(A) through 17(C) show an exemplary makeup for the defect entry 31 and also show the attributes of defects to be managed by the defect entry 31. As shown in FIG. 17(A), the defect entry 31 is made up of a first status field 31a, a first address field 31b, a second status field 31c, and a second address field 31d. It should be noted that this is just an exemplary makeup for the defect entry 31 and any other arbitrary field could be included in the entry 31 as well.

As will be described later, the first and second status fields 31a and 31c indicate the attribute (or the type) of their defect entry 31. In the first and second address fields 31b and 31d, stored are information about the locations of the defective clusters or replacement clusters and other pieces of information according to the attributes of the first and second status fields 31a and 31c. For example, the first address field 31b may store the physical address of the top sector of a defective cluster and the second address field 31d may store the physical address of the top sector of a replacement cluster.

The first status field 31a may be flag information of four bits, for example. FIG. 17(B) shows what the first status field 31a may define in some instances.

Specifically, if the first status field 31a has a value "0000", it means that a replacement cluster has been allocated to a defective cluster and that the user data that should have been written on the defective cluster has already been written on the replacement cluster instead (such an attribute will be referred to herein as "RAD0").

On the other hand, if the first status field 31a has a value "1000", it means that a replacement cluster has been allocated to a defective cluster and that the user data that should have been written on the defective cluster has not been written on the replacement cluster yet (such an attribute will be referred to herein as "RAD1").

Furthermore, if the first status field 31a has a value "0001", it means that a replacement cluster has not been allocated to a defective cluster yet (such an attribute will be referred to herein as "NRD").

Furthermore, if the first status field 31a has a value "0010", it means that this defect entry 31 provides no significant information about the location of a defective cluster (such an attribute will be referred to herein as "SPR"). Nevertheless, the sector address specified by the second address field 31d of this defect entry 31 means that a cluster headed by that sector (i.e., a cluster in the spare area 15) is usable as a replacement in the future.

Furthermore, if the first status field 31a has a value "0100", it means that this area could be defective clusters (such an attribute will be referred to herein as "PBA"). In other words, such an area has not yet been recognized to be, but could be, defective clusters. And this is an attribute to be generated mainly by physical reformatting as will be described later. In that case, the first address field 31b of the defect entry 31 indicates the physical address of the top sector of the first one of the potential defective clusters in that area and the second address field 31d indicates the size (e.g., the number of clusters) of those potential defective clusters.

Furthermore, if the first status field 31a has a value "0111", it means that this is a defective cluster in the spare area 15 (such an attribute will be referred to herein as "UNUSE").

In this case, unless the attribute is SPR attribute or UNUSE attribute, the information about the location of the defective cluster is usually specified by the first address field 31b of the defect entry 31. On the other hand, if the attribute is SPR attribute or UNUSE attribute, the information about the location of the defective cluster is usually specified by the second address field 31d thereof.

In the foregoing description, the defect entry 31 is supposed to contain location information about defective clusters. However, the clusters indicated by the defect entry 31 do not have to be defective ones. More specifically, the RAD0 attribute, for example, indicates that a replacement cluster has been allocated to a certain cluster and a replacement write operation has been performed on that replacement cluster. Thus, even if non-defective, a certain cluster may be intentionally replaced with a replacement cluster for some reason. Meanwhile, the NRD attribute indicates that no replacement cluster has been allocated to the defective cluster. However, this is an attribute indicating that no valid data has been written on (or can be retrieved from) the cluster with the NRD attribute. That is why a cluster on which no valid data has been written for some reason may be managed as having the NRD attribute.

The second status field 31c may provide flag information of four bits, for example. As shown in FIG. 17(C), if the second status field 31c is 0000, it means that that field is not used. However, if the second status field 31c is 0100, it means that the cluster specified by the first or second address field 31b or 31d has been subjected to physical reformatting as will be described later. This means that the defect that should be present in the cluster according to the first or second address field 31b or 31d may have already been repaired by cleaning during that physical reformatting and also means that there is no significant user data in either the defective cluster or the replacement cluster.

FIG. 18 shows some typical combinations of the first and second status fields 31a and 31c in the defect entry 31.

As for the PBA attribute for use to manage a defective cluster in the user data area 14 and for the SPR attribute for use to manage a cluster in the spare area 15, a defect entry 31, of which the second status field 31c indicating that the defect may have been repaired by physical reformatting is 0100 (such a status will be referred to herein as "RDE status"), may be generated.

Every attribute of the defect entry 31 but the PBA attribute is managed on a cluster (or block) basis. On the other hand, the PBA attribute can be used to manage an area that covers more than one cluster (or block), i.e., multiple clusters (or blocks).

The defect entries 31 included in the DFL 21 are managed while being sorted. More specifically, the defect entries 31, except the most significant bit of their first status field 31a, may be sorted and managed in the ascending order, for example. That is to say, the management is supposed to be made collectively on a defect attribute basis (but RAD0 and RAD1 are regarded as having the same attribute) and then each group of defect entries 31 with the same defect attribute are sorted in the ascending order according to the physical addresses of their clusters to be managed (i.e., the clusters indicated by the first and second address fields 31b and 31d).

Hereinafter, the physical reformatting will be described.

To perform a write operation on the optical disc 1 for the first time, initialization formatting is carried out in order to determine the arrangement of the user data area 14 and the spare area 15 in the data area 5. However, an optical disc 1 on which some data has already been written may also be formatted separately. Such formatting is called "physical reformatting".

The greater the number of defective clusters, the more frequently replacement clusters need to be accessed. As a result, the read/write rate (or performance) could drop so steely that some inconveniences could occur when a moving picture is recorded or played back, in particular. Also, the spare area 15 including replacement clusters needs to be secured in the data area 5. That is why if too many replacement areas were provided to prepare for a situation where replacement needs to be made frequently, then the size of the user data that could be stored (i.e., the space left in the user data area 14) would decrease significantly. In that case, the physical reformatting (or re-initialization) would be carried out after the dirt on the surface of the disc has been cleaned up. This is because defects to be subsequently produced on the disc (which will be referred to herein as "subsequent defects") are often caused by fingerprints, dust or any other dirt that has been deposited on the disc surface. That is why by cleaning such dirt up, most of those subsequent defects could possibly disappear. The physical reformatting could be done by determining whether a defective cluster, registered with the DFL 21, actually has a defect or not by performing a test write operation called "certify operation" on the entire surface of the disc. The physical reformatting could also be done by changing the defect attributes of a defect entry 31 on the DFL 21 into some attribute indicating that the defect may have been repaired (e.g., changing the second status field 31c of the defect entry 31 into "0100"). Or the physical reformatting could even be done by initializing the DFL 21 (i.e., changing it to a state in which no defective clusters have been registered yet) when the disc 1 is subjected to initialization formatting to perform a write operation thereon for the first time. It should be noted that once the physical reformatting has been carried out, all of the user data stored in the data area 5 will become invalid data except in some special situations. Such a "special situation" could occur if the physical reformatting function of changing only the sizes of the spare area 15 were provided with the user data stored in the data area 5 kept valid.

Hereinafter, it will be described how to manage those clusters that are usable as replacement clusters from the spare area 15. Such clusters that can be allocated as replacement clusters may be managed in the following manner, for example.

First of all, in a write-once information recording medium, those clusters may be managed using pointer information that indicates the location (i.e., physical address) of the next available cluster in the spare area 15 (see Patent Documents No. 3 (U.S. Pat. No. 5,715,221) and No. 4 (Japanese Patent Application Laid-Open Publication No. 2006-344375), for example). Also, to get such management done, those clusters in the spare area 15 need to be used in some restricted order. Such restriction may be laid down so that those clusters in each spare area 15 should be used in the direction in which the track path is scanned (i.e., the clusters should be used in the ascending order according to their physical addresses) or that a number of spare areas 15 should also be used in the ascending order according to their physical addresses.

Alternatively, as already described with reference to FIG. 17, available clusters and unavailable clusters in the spare area 15 could be managed as a defect entry 31 on a cluster-by-cluster basis (see Patent Document No. 2 (Japanese Patent Publication No. 3858050). In that case, all clusters included in the spare area 15 are managed on the DFL 21 as belonging to a defect entry 31, of which the first status field 31a is 0010 (SPR), and a defect entry 31, of which the first status field 31a is 0111 (UNUSE). According to such a method, it can be seen at once that in a location indicated by the defect entry 31 with the SPR attribute, which is used to manage the locations of clusters that are usable as replacement clusters, there is a cluster usable as a replacement cluster. Also, as for the spare area 15, the replacement cluster may be selected anywhere as long as the cluster is managed using the defect entry 31 with the SPR attribute.

SUMMARY OF THE INVENTION

Both of these two methods, however, have some drawbacks. First of all, the former method for managing the next available cluster using pointer information will certainly be effectively applicable to a write-once information recording medium on which a write operation can be performed only once. However, such a method will not be effective to a rewritable information recording medium on which a write operation can be performed a number of times and which can be subjected to physical reformatting. This is because unlike a write-once information recording medium, a rewritable information recording medium could change its statuses during its use. For example, in a rewritable information recording medium, the pointer information could be changed (i.e., updated) or the information about the defective cluster managed with the DFL (see FIG. 16) could be lost as a result of physical formatting. That is why the location indicated by the pointer information must be a cluster to be used for the first time in the case of a write-once information recording medium but will not always be such a cluster to be used for the first time in the case of a rewritable information recording medium. In the latter case, the location indicated by the pointer information could even be a cluster that has been detected as a defective cluster once. That is to say, as for a rewritable information recording medium, if the replacement cluster were allocated just by reference to the pointer information as in a write-once information recording medium, a cluster that used to be defective one in the past might be allocated and the performance of the replacement write operation could decline.

In order to overcome such a problem, the latter method for managing both available clusters and unavailable clusters in the spare area 15 on a cluster-by-cluster basis as a defect entry 31 on the DFL 21 was proposed. According to such a method, the information about the location of a defective cluster is not erased but left, and information indicating that the physical reformatting has been carried out is set on the second status field 31c of the defect entry 31. In that case, the information about a previously defective cluster will be left as it is even after the physical reformatting. As a result, the risk of allocating such a formerly defective cluster as a replacement cluster after the physical reformatting is done can be reduced. According to this method, however, the defect entry 31 needs to be provided for each of the clusters included in the spare area 15. That is why even in an initial state in which there are no defective clusters at all, the number of defect entries 31 provided should be at least equal to the total number of clusters included in the spare area 15. Consequently, the minimum required size of the DFL 21 would increase according to the size of the spare area 15. In the example shown in FIG. 2, only one spare area 15 is supposed to be arranged at an inner radial location on the recording layer. Actually, however, the spare areas 15 may also be arranged not only at such an inner radial location but also at an outer radial location as well. Furthermore, if the given recording medium has two recording layers, normally a spare area 15 is provided for each of the two recording layers. That is why if such a method is applied to multilayer recording medium with three, four or more recording layers to be used more and more often in the near future, the minimum required size of the DFL 21 will increase, which is a problem. And if the size of the DFL increases, the size of a DMA to store the DFL 21 will increase, too. On top of that, information about the DFL 21 needs to be used to perform address conversion for calculating the actual access location when a read/write operation is performed on an information recording medium. For that reason, it is not efficient to retrieve information about the DFL 21 from the information recording medium every time a read/write operation is performed on the recording medium. Thus, the information once retrieved is normally retained in a memory such as a DRAM. To get that done, however, the storage capacity of such a memory should also be increased, which is also a problem.

For these reasons, there is increasing demand for a method that can overcome both of these two problems at the same time. Specifically, a defect management method, by which the size of the DFL 21 can be small enough even if the size of the spare area 15 increases and by which a defective cluster in the spare area 15 can still be recognized to be a defective one and not allocated as a replacement cluster even after the physical reformatting, needs to be developed.

An information recording medium according to the present invention is a rewritable information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a spare defect attribute indicating the location of the defective block, if any, in the spare area; a defect entry specifying the sector address of the defective block; and next available spare location information for use to manage a location in the spare area from which a next replacement block is available.

In one preferred embodiment, the at least one spare area of the information recording medium includes multiple spare areas, and the defect management information includes the next available spare location information that is defined for each of those multiple spare areas.

In another preferred embodiment, the spare defect attribute includes at least one of: a definite spare defect attribute indicating that the defective block in the spare area is definitely unusable; and a provisional spare defect attribute indicating that the defective block in the spare area used to be a defective one but may have had its defect repaired by now.

An information recording method according to the present invention is a method for writing information on a rewritable information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a spare defect attribute indicating the location of the defective block, if any, in the spare area; a defect entry specifying the sector address of the defective block; and next available spare location information for use to manage a location in the spare area from which a next replacement block is available. The recording method includes the steps of: allocating a replacement block to the defective block by reference to the next available spare location information and the defect entry; and updating the next available spare location information.

In one preferred embodiment, the recording method includes, if the replacement block has been allocated, the steps of: (a) determining whether or not the location of the next block that follows the replacement block allocated matches to the sector address specified by the defect entry; if the answer to the step (a) is NO, then (b) updating the next available spare location information so that the information indicates the location of that next block; but if the answer to the step (a) is YES, then (c) updating the next available spare location information so that the information indicates the location of a block that follows that next one in the predetermined direction with the defective block indicated by the defect entry avoided.

In this particular preferred embodiment, the spare defect attribute includes at least one of: a definite spare defect attribute indicating that the defective block in the spare area is definitely unusable; and a provisional spare defect attribute indicating that the defective block in the spare area used to be a defective one but may have had its defect repaired by now. The step (a) includes determining whether or not the location of the next block matches to the sector address of the defective block having the definite spare defect attribute. If the answer to the step (a) is YES, the step (c) includes updating the next available spare location information so that the information indicates the location of a block that follows that next one in the predetermined direction with the defective block having the definite spare defect attribute avoided.

In still another preferred embodiment, the spare defect attribute includes a provisional spare defect attribute indicating that the defective block in the spare area used to be a defective one but may have had its defect repaired by now. The recording method includes the steps of: (a) determining whether or not the location of the next block that follows the replacement block allocated matches to the sector address of the defective block having the provisional spare defect attribute; and if the answer to the step (a) is YES, then (b) updating the next available spare location information so that the information indicates the location of that next block.

In yet another preferred embodiment, the spare defect attribute includes a provisional spare defect attribute indicating that the defective block in the spare area used to be a defective one but may have had its defect repaired by now. If it has turned out, while the replacement block is being allocated, that the location of the block indicated by the next available spare location information does not match to the sector address specified by the defect entry, the block pointed to by the next available spare location information is allocated as the replacement block. But if it has turned out, while the replacement block is being allocated, that the location of the block indicated by the next available spare location information matches to the sector address managed by the provisional spare defect attribute, then performed is one of the steps of: (a) allocating the block managed by the provisional spare defect attribute as the replacement block; and (b) allocating a next block, which is determined by skipping that block managed by the provisional spare defect attribute in the predetermined direction, as the replacement block.

In yet another preferred embodiment, the recording method includes, if the replacement block is allocated, the steps of: (a) determining whether or not the location indicated by the next available spare location information provided matches to the sector address specified by the defect entry; if the answer to the step (a) is NO, then (b) determining the block pointed to by the next available spare location information to be the replacement block, but if the answer to the step (a) is YES, then (c) avoiding the defective block indicated by the defect entry and determining the next block that follows the defective block in the predetermined direction to be the replacement block. And the method further includes the step of (d) updating, if necessary, the next available spare location information so that the information indicates the location of a block that follows the block that has been determined to be the replacement block in either the step (b) or (c).

In this particular preferred embodiment, the at least one spare area of the information recording medium includes multiple spare areas. The defect management information includes the next available spare location information that is defined for each of those multiple spare areas. The step (a) includes the steps of: choosing one of the multiple spare areas that needs to be used to allocate the replacement block; and determining whether or not the next available spare location information provided for that spare area chosen matches to the sector address specified by the defect entry.

In an alternative preferred embodiment, the step (a) includes the steps of: deciding the defect entry, to which the next available spare location information needs to be compared, to see if the entry matches to the information; and if the answer is YES, then updating the defect entry, to which the next available spare location information needs to be compared to see if they match, into a next defect entry.

In still another preferred embodiment, the spare defect attribute includes: a definite spare defect attribute indicating that the defective block in the spare area is definitely unusable; and a provisional spare defect attribute indicating that the defective block in the spare area used to be a defective one but may have had its defect repaired by now. The step (a) includes the steps of: deleting the defect entry having the provisional spare defect attribute if the defect entry specifies the same sector address as the one indicated by the next available spare location information; and determining whether or not the location indicated by the next available spare location information matches to the sector address specified by the defect entry having the definite spare defect attribute.

An information recording apparatus according to the present invention is an apparatus for writing information on a rewritable information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a spare defect attribute indicating the location of the defective block, if any, in the spare area; a defect entry specifying the sector address of the defective block; and next available spare location information for use to manage a location in the spare area from which a next replacement block is available. The information recording apparatus allocates a replacement block to the defective block by reference to the next available spare location information and the defect entry and updates the next available spare location information.

In one preferred embodiment, if the replacement block has been allocated, the recording apparatus determines whether or not the location of the next block that follows the replacement block allocated matches to the sector address specified by the defect entry. If the apparatus has decided that the location does not match to the sector address, the apparatus updates the next available spare location information so that the information indicates the location of that next block. But if the apparatus has decided that the location does match to the sector address, then the apparatus updates the next available spare location information so that the information indicates the location of a block that follows that next one in the predetermined direction with the defective block indicated by the defect entry avoided.

In this particular preferred embodiment, the spare defect attribute includes at least one of: a definite spare defect attribute indicating that the defective block in the spare area is definitely unusable; and a provisional spare defect attribute indicating that the defective block in the spare area used to be a defective one but may have had its defect repaired by now. The recording apparatus determines whether or not the location of the next block that follows the block allocated as the replacement block matches to the sector address of the defective block having the definite spare defect attribute. If the apparatus has decided that the location matches to the sector address, the apparatus updates the next available spare location information so that the information indicates the location of a block that follows that next one in the predetermined direction with the defective block having the definite spare defect attribute avoided.

In another preferred embodiment, the spare defect attribute includes a provisional spare defect attribute indicating that the defective block in the spare area used to be a defective one but may have had its defect repaired by now. The recording apparatus determines whether or not the location of the next block that follows the replacement block allocated matches to the sector address of the defective block having the provisional spare defect attribute. If the apparatus has decided that the location does match to the sector address, then the apparatus updates the next available spare location information so that the information indicates the location of that next block that follows the block allocated as the replacement block.

In still another preferred embodiment, the spare defect attribute includes a provisional spare defect attribute indicating that the defective block in the spare area used to be a defective one but may have had its defect repaired by now. If the recording apparatus has found, while allocating the replacement block, that the location of the block indicated by the next available spare location information does not match to the sector address specified by the defect entry, the apparatus allocates the block pointed to by the next available spare location information as the replacement block. But if the apparatus has found, while allocating the replacement block, that the location of the block indicated by the next available spare location information matches to the sector address managed by the provisional spare defect attribute, then the apparatus allocates the replacement block by either (a) allocating the block managed by the provisional spare defect attribute as the replacement block, or (b) allocating a next block, which is determined by skipping that block managed by the provisional spare defect attribute in the predetermined direction, as the replacement block.

In yet another preferred embodiment, the recording apparatus includes: a decision section for deciding, to allocate the replacement block, whether or not the location indicated by the next available spare location information provided matches to the sector address specified by the defect entry; and a determining section that determines, if the decision section has found the location and the sector address not matching to each other, the block pointed to by the next available spare location information to be the replacement block. If the decision section has found the information and the sector address matching to each other, the determining section determines the next block that follows, in the predetermined direction, the defective block indicated by the defect entry to be the replacement block. The recording apparatus further comprises an updating section for updating, if necessary, the next available spare location information so that the information indicates the location of the next block that follows the one determined to be the replacement block by the determining section.

In this particular preferred embodiment, the at least one spare area of the information recording medium includes multiple spare areas. The defect management information includes the next available spare location information that is defined for each of those multiple spare areas. The decision section chooses one of the multiple spare areas that needs to be used to allocate the replacement block and determines whether or not the next available spare location information provided for that spare area chosen matches to the sector address specified by the defect entry.

In another preferred embodiment, the decision section decides the defect entry, to which the next available spare location information needs to be compared, to see if the entry matches to the information. If the decision section has found the entry and the information matching, then the decision section updates the defect entry, to which the next available spare location information needs to be compared to see if they match, into a next defect entry.

In this particular preferred embodiment, the spare defect attribute includes: a definite spare defect attribute indicating that the defective block in the spare area is definitely unusable; and a provisional spare defect attribute indicating that the defective block in the spare area used to be a defective one but may have had its defect repaired by now. The decision section deletes the defect entry having the provisional spare defect attribute if the defect entry specifies the same sector address as the one indicated by the next available spare location information, and determines whether or not the location indicated by the next available spare location information matches to the sector address specified by the defect entry having the definite spare defect attribute.

An information reproducing method according to the present invention is a method for reading information from an information recording medium on which the information has been written by the information recording method of the present invention described above. The information is retrieved by scanning the replacement block allocated.

An information reproducing apparatus according to the present invention is an apparatus for reading information from an information recording medium on which the information has been written by the information recording apparatus of the present invention described above. The information is retrieved by scanning the replacement block allocated.

Another information recording method according to the present invention is a method for writing information on a rewritable information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a defect entry specifying the sector address of the defective block; and next available spare location information for use to manage a location in the spare area from which a next replacement block is available. The information recording method includes the steps of: (a) detecting a defective block in the user data area; (b) detecting a defective block in the spare area; (c) allocating a replacement block to the defective block that has been detected in the step (a) so that the defective block detected in the step (b) is avoided and that blocks of the spare area are sequentially used in a predetermined direction on a first come, first use basis; (d) adding a defect entry, including the sector address of the defective block that has been detected in the step (a), to the defect management information; (e) updating the next available spare location information so that the information indicates the location of the next block that follows the replacement block allocated in the step (c); and (f) writing the defect management information that has been updated in the steps (d) and (e) on the defect management information area.

In one preferred embodiment, the at least one spare area of the information recording medium includes multiple spare areas. The defect management information provides the next available spare location information for each of those spare areas. The step (c) includes choosing one of the spare areas that is going to be used to allocate the replacement block. The step (e) includes updating the next available spare location information for the spare area chosen so that the information indicates the location of the next block that follows the replacement block allocated in the step (c).

Another information recording apparatus according to the present invention is an apparatus for writing information on a rewritable information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a defect entry specifying the sector address of the defective block; and next available spare location information for use to manage a location in the spare area from which a next replacement block is available. The information recording apparatus includes: a user data area defective block detecting section for detecting a defective block in the user data area; a spare area defective block detecting section for detecting a defective block in the spare area; a replacement block calculating section for allocating a replacement block to the defective block that has been detected in the user data area so that the defective block detected in the spare area is avoided and that blocks of the spare area are sequentially used in a predetermined direction on a first come, first use basis and for adding a defect entry, specifying the sector address of the defective block that has been detected in the user data area, to the defect management information; a next available spare location information updating section for updating the next available spare location information so that the information indicates the location of the next block that follows the replacement block allocated; and a management information writing section for writing the defect management information that has been updated by the replacement block calculating section and the next available spare location information updating section on the defect management information area.

In one preferred embodiment, the at least one spare area of the information recording medium includes multiple spare areas. The defect management information provides the next available spare location information for each of those spare areas. The replacement block calculating section chooses one of the spare areas that is going to be used to allocate the replacement block, and the next available spare location information updating section updates the next available spare location information for the spare area chosen so that the information indicates the location of the next block that follows the replacement block allocated.

Another information recording medium according to the present invention is an information recording medium on which information is written by the information recording method of the present invention described above. The recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a defect entry specifying the sector address of the defective block; and next available spare location information for use to manage a location in the spare area from which a next replacement block is available. The defect management information updated is written on the defect management information area.

An information reproducing method according to the present invention is a method for reading information from an information recording medium on which the information has been written by the information recording method of the present invention described above. The information is retrieved by scanning the replacement block allocated.

An information reproducing apparatus according to the present invention is an apparatus for reading information from an information recording medium on which the information has been written by the information recording apparatus of the present invention described above. The information is retrieved by scanning the replacement block allocated.

The rewritable information recording medium of the present invention provides next available spare location information 43 (see FIG. 3), indicating which location is available next time, for each of the spare areas 15, and defines the order (or direction) in which each spare area 15 should be used (e.g., requires that each spare area 15 be used in the ascending order of physical addresses). Furthermore, defect entries 31 with such a defect attribute that contributes to managing defects in the spare area 15 are provided for the DFL 21. By adopting such a configuration, even if the size of the spare area 15 increases in the near future along with the number of recording layers per disc, the size of the DFL 21 can still be small enough. Also, if information about a defective cluster in the spare area 15 before the physical reformatting is retained, the performance of the defect replacement processing will not decline even after the physical reformatting is done.

In addition, by reference to the next available spare location information 43 and the defect entries 31, replacement clusters in the spare area 15 are allocated to the defective blocks and the next available spare location information 43 is updated. As a result, there is no need to perform time-consuming processing in which a write operation is actually performed on a given cluster in the spare area 15 to determine whether the cluster is defective one or not. Consequently, when a replacement write operation is performed, appropriate replacement clusters can be allocated quickly.

Furthermore, replacement clusters to be allocated during the physical reformatting are used on a first come, first use basis in the order (or direction) in which the spare area 15 is used. As a result, in the direction in which the spare area 15 is used, there will never be clusters that have already been allocated as replacement ones after the location indicated by the next available spare location information 43. Consequently, used clusters of the spare area 15 can be managed only by reference to the next available spare location information 43. That is to say, there is no need to search for clusters that have already been allocated as replacements and registered with the DFL 21 after the physical reformatting is done.

BRIEF DESCRIPTION OF THE DRAWINGS

FIGS. 14(A) and 14(B) show the attributes and specific examples of defect entries 31 according to the third preferred embodiment of the present invention.

FIGS. 17(A) to 17(C) show the makeup and contents of a defect entry 31.

FIG. 18 shows specific examples of defect entries 31.

DETAILED DESCRIPTION OF PREFERRED EMBODIMENTS

Hereinafter, preferred embodiments of the present invention will be described with reference to the accompanying drawings.

Embodiment 1

An Information Recording Medium to be Described Below as a first specific preferred embodiment of the present invention is a rewritable optical disc with only one recording layer.

1. Area Arrangement/Data Structure

Figure 2:
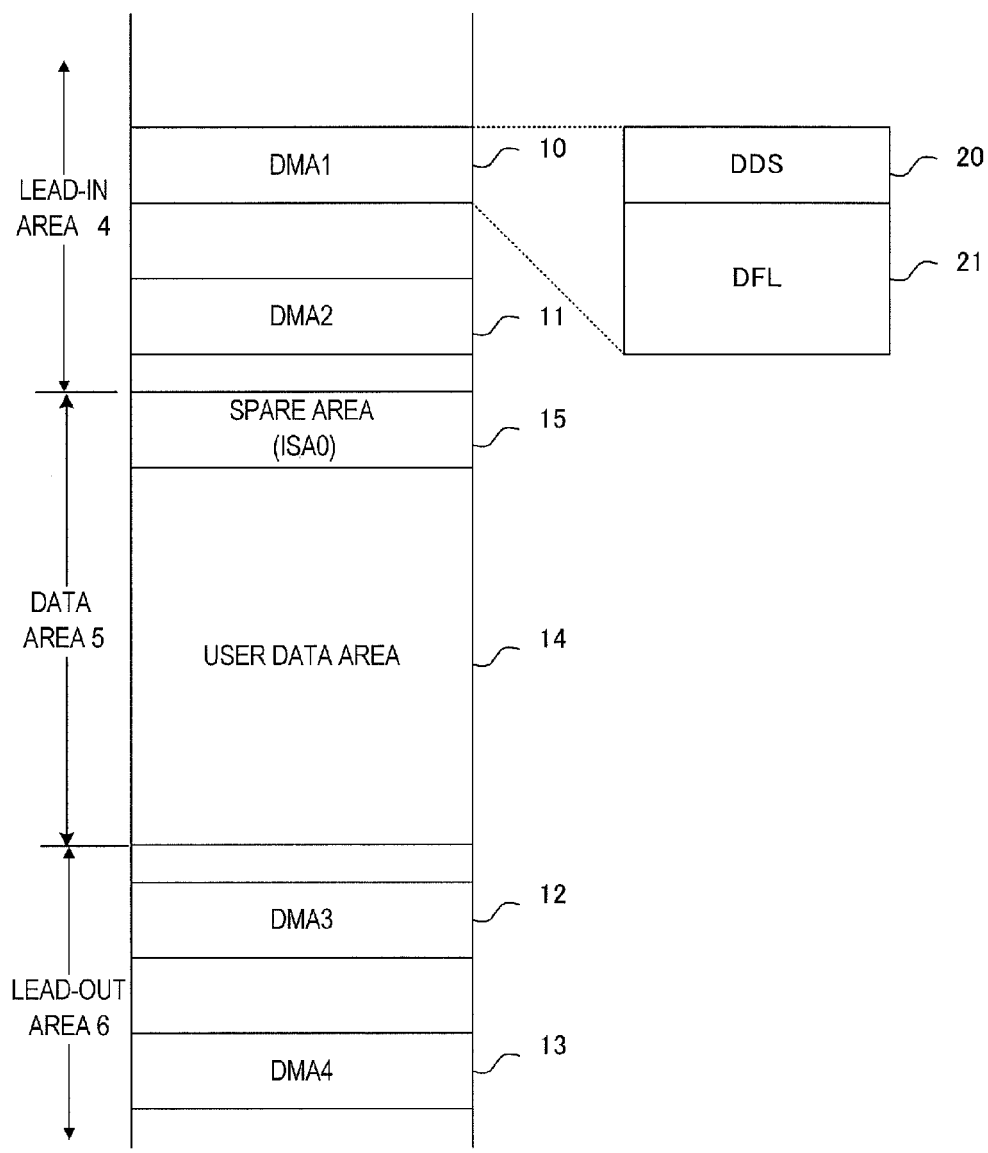
FIG. 2 shows a detailed arrangement of areas on the optical disc.

A rewritable optical disc as the first preferred embodiment of the present invention has the same data structure as the rewritable optical disc that has already been described with reference to FIG. 2 except how to use the spare area 15, the contents of the DFL header 30 included in the DFL 21, and the contents of the defect entry 31. Thus, the following description will be focused on only those differences.

Figures 3, 4:
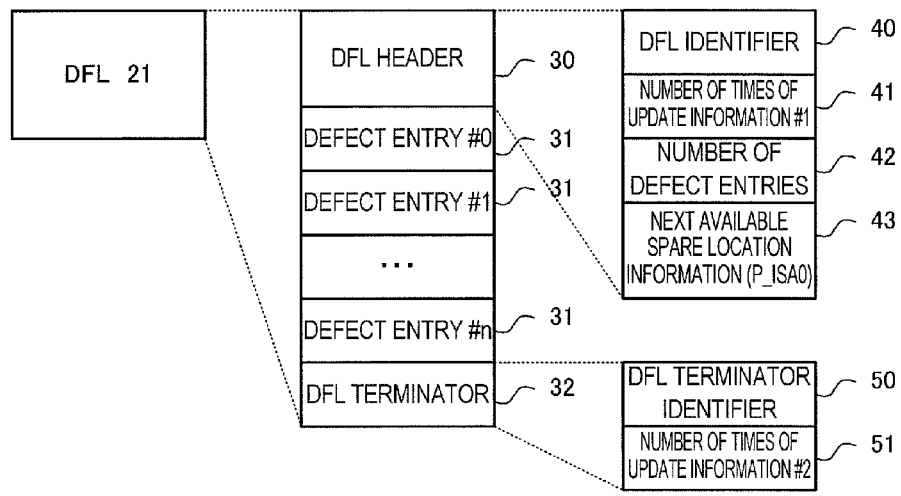
FIG. 3 shows the contents of data included in a DFL 21 according to a first preferred embodiment of the present invention.
FIG. 4 shows specific examples of defect entries 31 according to the first preferred embodiment of the present invention.

FIG. 3 shows the contents of the DFL 21 of the rewritable optical disc as the first preferred embodiment of the present invention.

The DFL header 30 contains not only the DFL identifier 40, which is identification information indicating that this piece of information is DFL, the first piece of number of times of update information 41 indicating how many times this DFL 21 has been updated so far, and the number of defective entries information 42 indicating how many defective entries 31 there are in this DFL 21 but also next available spare location information 43 for use to manage a location in the spare area 15 from which a next cluster is available (which will be referred to herein as "P_ISA0 (next available PSN of Inner Spare Area layer 0)" in the following description of the first preferred embodiment). The next available spare location information 43 is managed by the physical address number of the first sector of the next available cluster in that spare area 15. As for the management information about the next available location in the spare area 15 such as this next available spare location information 43, the same number of pieces of such information as that of the spare areas 15 that are present discretely on the optical disc 1 need to be contained in the DFL header 30. In this first preferred embodiment of the present invention, there is only one recording layer, the spare area 15 is arranged only on the inner side, and therefore, just one piece of next available spare location information is provided. If a number of spare areas 15 are arranged discretely, however, this next available spare location information 43 is provided for each of those spare areas 15. Such an arrangement will be described in detail later about a second specific preferred embodiment of the present invention.

FIG. 4 shows exemplary combinations of first and second status fields 31a and 31c in each defect entry 31 according to the first preferred embodiment.

In this first preferred embodiment of the present invention, each piece of defect management information includes a defect entry 31, which includes a spare defect attribute indicating where a defective cluster is in the spare area 15 and the sector address of that defective cluster (i.e., the physical address of its first sector), and next available spare location information 43 for use to manage a location in the spare area 15 from which the next replacement cluster is available.

Thus, the DFL 21 can be designed so as not to include a defect entry 31, of which the first status field 31a is 0010 (SPR) and the second status field 31c is 0000. More specifically, unless the location indicated by the next available spare location information 43 is a defective cluster managed by the defect entry 31, that cluster can be determined to be usable as a replacement cluster (i.e., equivalent to the defect entry 31, of which the first status field 31a is 0010 (SPR) and the second status field 31c is 0000). That is to say, as shown in FIG. 4, only the SPR (RDE) attribute (i.e., the second status field 31c is 0100), which a defect entry 31 for managing a cluster that used to be a defective cluster in the spare area 15 before the physical reformatting (i.e., a cluster of which the first status field 31a was 0111 (UNUSE)), is the defect entry 31 with the SPR attribute.

In other words, unlike the rewritable optical disc that has already been described with reference to FIG. 17, a cluster in the spare area 15 that can provide a replacement cluster is not managed according to this preferred embodiment in the form of a defect entry 31. That is to say, according to this first preferred embodiment of the present invention, such an available cluster in the spare area 15 is managed by reference to the next available spare location information 43 included in the DFL header 30, not as a defect entry 31.

Figure 13:
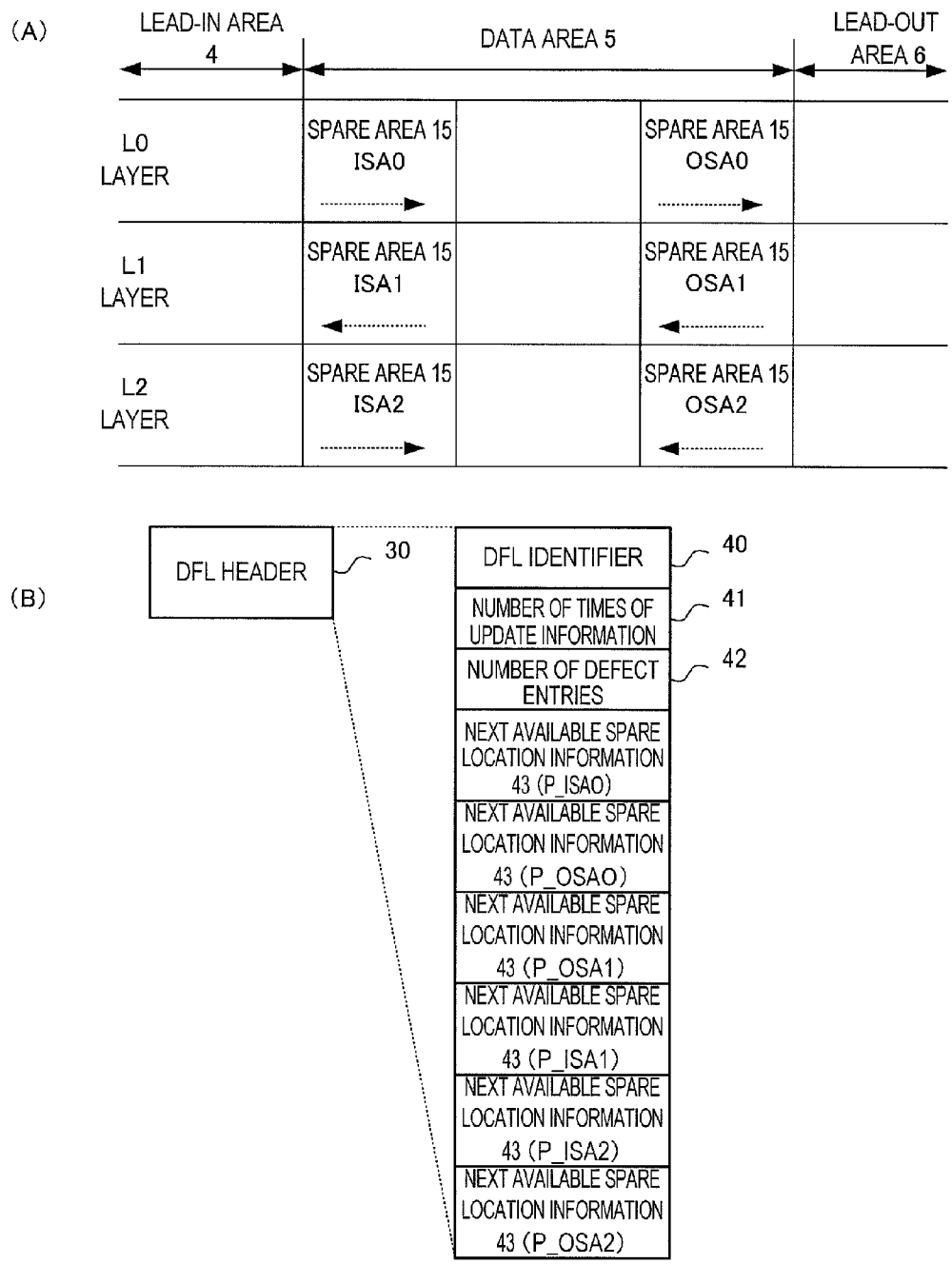
FIGS. 13(A) and 13(B) show the directions in which spare areas 15 are used and the contents of data included in a DFL header 30 according to the second and third preferred embodiments of the present invention.

Also, in order to manage next available cluster locations in the spare area 15 by reference to the next available spare location information 43 and other pieces of information, a restriction that every spare area 15 must be used sequentially in a predetermined direction is laid down. Specifically, as for the spare area 15, clusters should be used sequentially in the track path direction (i.e., the ascending order of physical addresses so that the cluster with the smallest physical address is used first and then clusters that follows it are used sequentially in the order of their physical addresses). Or if two spare areas 15 are respectively arranged on the inner and outer sides of each recording layer as shown in FIG. 13, the spare areas 15 arranged on the inner side (ISA0, ISA1 and ISA2) should be used from the inner side of the optical disc 1 toward the outer side thereof, while the spare areas 15 arranged on the outer side (OSA0, OSA1 and OSA2) should be used from that outer side of the optical disc 1 toward the inner side. Alternatively, in every spare area 15, the clusters could also be used in the ascending order of their physical addresses. Still alternatively, to cope with a situation where only the spare area 15 is expanded by physical reformatting, the clusters could be used in the ascending order of their physical addresses in all spare areas 15 but the spare area 15 with the biggest physical address (i.e., OSA2 in the example illustrated in FIG. 13) and the clusters could be used in the descending order of their physical addresses only in OSA2.

It should be noted that as for clusters to be used within a single spare area 15, their order of use is restricted. However, there is no need to determine the order of using the spare areas 15 that are arranged discretely. In other words, it is not necessary to determine which of those spare areas 15 should be used first. That is to say, the spare area to use first to find a replacement does not have to be ISA0 but could also be OSA2 (see FIG. 12), for example.

In this first preferred embodiment of the present invention, the next available spare location information 43 is supposed to be included in the DFL header 30. The reason is as follows. Specifically, as for a DMA, a reserved area to store the DFL 21 is usually provided, considering that a defect could occur when the DMA itself deteriorates after numerous cycles of write operations. However, since the DDS 20 including the location information of various kinds of management information should be stored at a predetermined location in the DMA, no reserved area is often provided for it in preparation for the future cycle deterioration. That is why information such as the next available spare location information 43 that needs to be updated every time a replacement write operation is performed during writing should rather be included in the DFL 21 than in the DDS 20 to cope with the cycle deterioration problem effectively. Meanwhile, as for a rewritable optical disc 1, of which the performance is too high to care about the cycle deterioration problem, the next available spare location information 43, which is a piece of management information about the next available cluster in the spare area 15, could be included in the DFL header 30 in the foregoing description. However, in such a high performance optical disc, the same effect would also be achieved even if that piece of information were included in the DDS 20.

2. Configuration for Optical Disc Reading/Writing Apparatus

Figure 5:
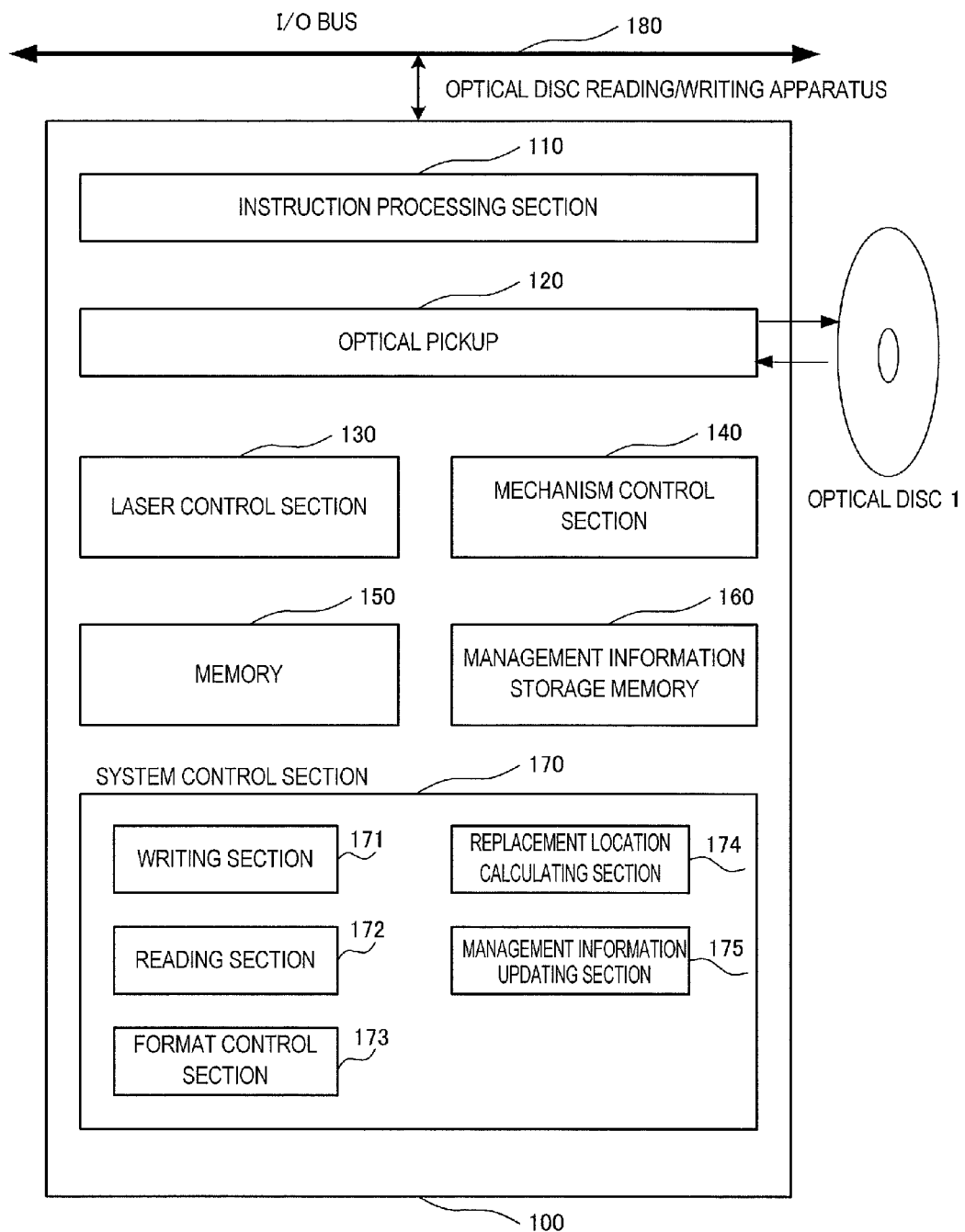
FIG. 5 is a block diagram illustrating an optical disc reading/writing apparatus 100 as a preferred embodiment of the present invention.

FIG. 5 illustrates a configuration for an optical disc reading/writing apparatus 100 for performing read and write operations on the optical disc 1 of the first preferred embodiment of the present invention. The read processing, write processing, format processing and various other kinds of processing of this preferred embodiment of the present invention are controlled by the respective control sections that this optical disc reading/writing apparatus 100 has.

The optical disc reading/writing apparatus 100 is connected to a high-order controller (not shown) through an I/O bus 180. The high-order controller may be a host computer (host PC), for example.

The optical disc reading/writing apparatus 100 includes: an instruction processing section 110 for processing instructions given by the high-order controller; an optical pickup 120 that irradiates the optical disc with a laser beam to perform a read/write operation on it; a laser control section 130 for controlling the power of the laser beam that has been emitted from the optical pickup 120; a mechanism control section 140 for moving the optical pickup 120 to a target location (i.e., performing a seek operation) and performing a servo control operation; a memory 150 for temporarily retaining the user data that has been read or written and various other kinds of information; a management information storage memory 160 for storing various management information such as the DDS 20 or the DFL 21 that has been read from, or written on, the DMA; and a system control section 170 for controlling the overall system processing including read/write processing on the optical disc 1.

The system control section 170 includes: a writing section 171 and a reading section 172 for reading and writing data including user data and management information; a formatting control section 173 for controlling the format processing such as initialization formatting and physical reformatting on the optical disc 1; a replacement location calculating section 174 for allocating some clusters in the spare area 15 as replacement clusters to defective ones; and a management information updating section 175 for updating the management information such as the DDS 20 or the DFL 21 that is stored in the management information storage memory 160.

The management information storage memory 160 may store the latest piece of management information that has just been retrieved by the reading section 172 from the DMA while the optical disc 1 is loaded, for example. And when the contents of the DFL 21 or the DDS 20 change after that (e.g., when a defective cluster is detected to increase the number of defect entries 31), the data corresponding to the DFL 21 and the data corresponding to the DDS 20 in the management information storage memory 160 will be updated mainly by the management information updating section 175. And at an arbitrary timing before the optical disc 1 is unloaded from the optical disc reading and writing apparatus 100 (e.g., just before the optical disc 1 is unloaded or when the optical disc 1 is not accessed for a predetermined amount of time), these data are transferred by the writing section 171 from DMA 1 to DMA4.

3. Writing Method 3-(1) Initialization Format

To perform a write operation on an unused (or unrecorded) optical disc 1, initialization formatting needs to be carried out as described above to determine the arrangement of the user data area 14 and the spare area 15 (i.e., the start position of the user data area 14 and the size of the spare area 15).

Figure 6:
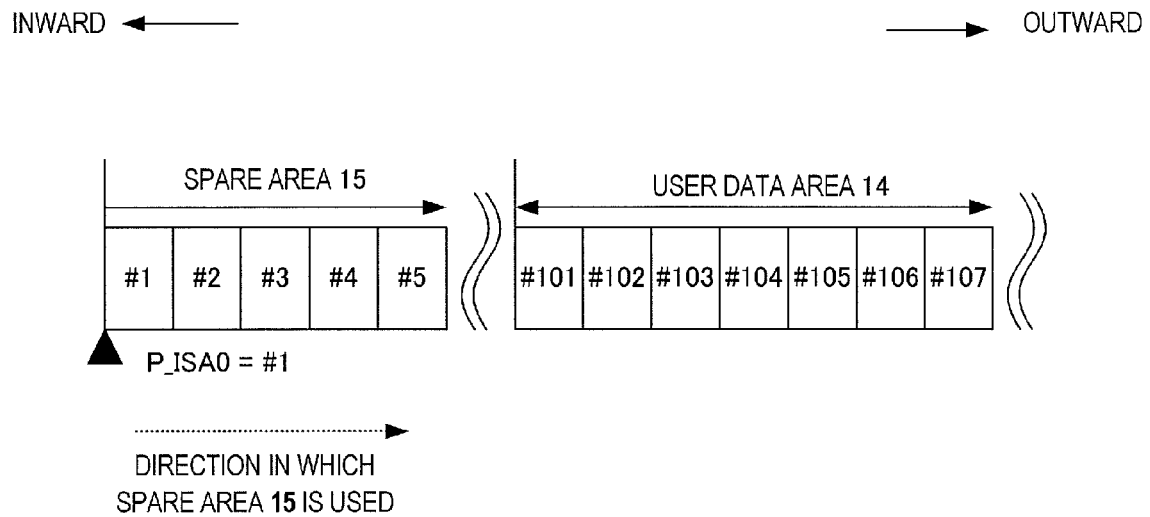
FIG. 6 illustrates a state of the optical disc 1 that has been subjected to initialization formatting according to the first preferred embodiment of the present invention.

FIG. 6 illustrates the status of the rewritable optical disc 1 of this first preferred embodiment of the present invention that has just been subjected to the initialization formatting. In FIG. 6, each numbered rectangle of the user data area 14 and the spare area 15 represents a cluster and the number itself indicates the physical address. Strictly speaking, however, one cluster consists of 32 sectors as far as a BD is concerned. And therefore, the physical addresses allocated to the respective sectors should increase by 32 from one cluster to another. In the following description of the first preferred embodiment of the present invention, however, the physical addresses shown on the drawings are supposed to increase one by one on a cluster-by-cluster basis for the sake of simplicity. Also, in the drawings, the left-hand side indicates the inner area of the optical disc 1 (i.e., closer to the lead-in area 4), while the right-hand side indicates the outer area thereof (i.e., closer to the lead-out area 5). Furthermore, the spare area 15 is supposed to be used from some inner location on the disc toward the outer edge thereof in the track path direction (i.e., its clusters are supposed to be used in the ascending order of their physical addresses so that the cluster with the smallest physical address is used first and the cluster with the largest address last).

When the initialization formatting is performed, no defective cluster has been detected yet from the user data area 14 or the spare area 15 on the optical disc 1. That is why right after the initialization formatting has been done, the DFL 21 is still empty (i.e., there are no defect entries 31 at all, and the number of defect entries 42 is zero). And the next available spare location information 43 that indicates a location in the spare area from which a next replacement cluster is available points to the first location in the spare area 15. In the example illustrated in FIG. 6, the spare area 15 is used in the directions indicated by the dotted arrow (i.e., in the ascending order of physical addresses), and therefore, the next available spare location information points to #1, which indicates the first cluster closest to the inner edge. Such a DFL will be referred to herein as an "initial DFL".

That is to say, if the initialization formatting is requested, first of all, the format control section 173 in the system control section 170 generates a DDS 20 in an initial state (see FIG. 2), which defines the respective start positions of the initial DFL and the user data area 14 and the size of the spare area 15, in the management information storage memory 160. Such a DDS 20 in the initial state will be referred to herein as "initial DDS". Then, the writing section 171 writes the initial DFL and the initial DDS. It should be noted that before the writing section 171 starts the write operation, the system control section 170 preferably sets writing conditions such as the laser power and write strategy for the laser control section 130 and gets the optical pickup 120 moved by the mechanism control section 140 to the target location in the DMA area through a seek operation. In the rest of the description, when a write operation is performed by the writing section 171, the write operation is supposed to include setting those writing conditions and moving the optical pickup 120 to the target location.

It should be noted that even if the physical reformatting to be described later is carried out on such an optical disc 1 on which there is no single defective cluster at all in either the user data area 14 or the spare area 15, the same status as the one shown in FIG. 6 will also arise.

3-(2) Relation Between Normal Defect Replacement Writing and Defect Entry 31

FIGS. 7(A) through 7(D) illustrate what if a write operation is performed on the optical disc 1 in the status shown in FIG. 6, i.e., the optical disc 1 that has just been subjected to the initialization formatting, and also illustrate how and where to allocate a replacement cluster if any defective cluster has been detected, and further show the contents of the defect entry 31 in the DFL 21.

Figure 7:
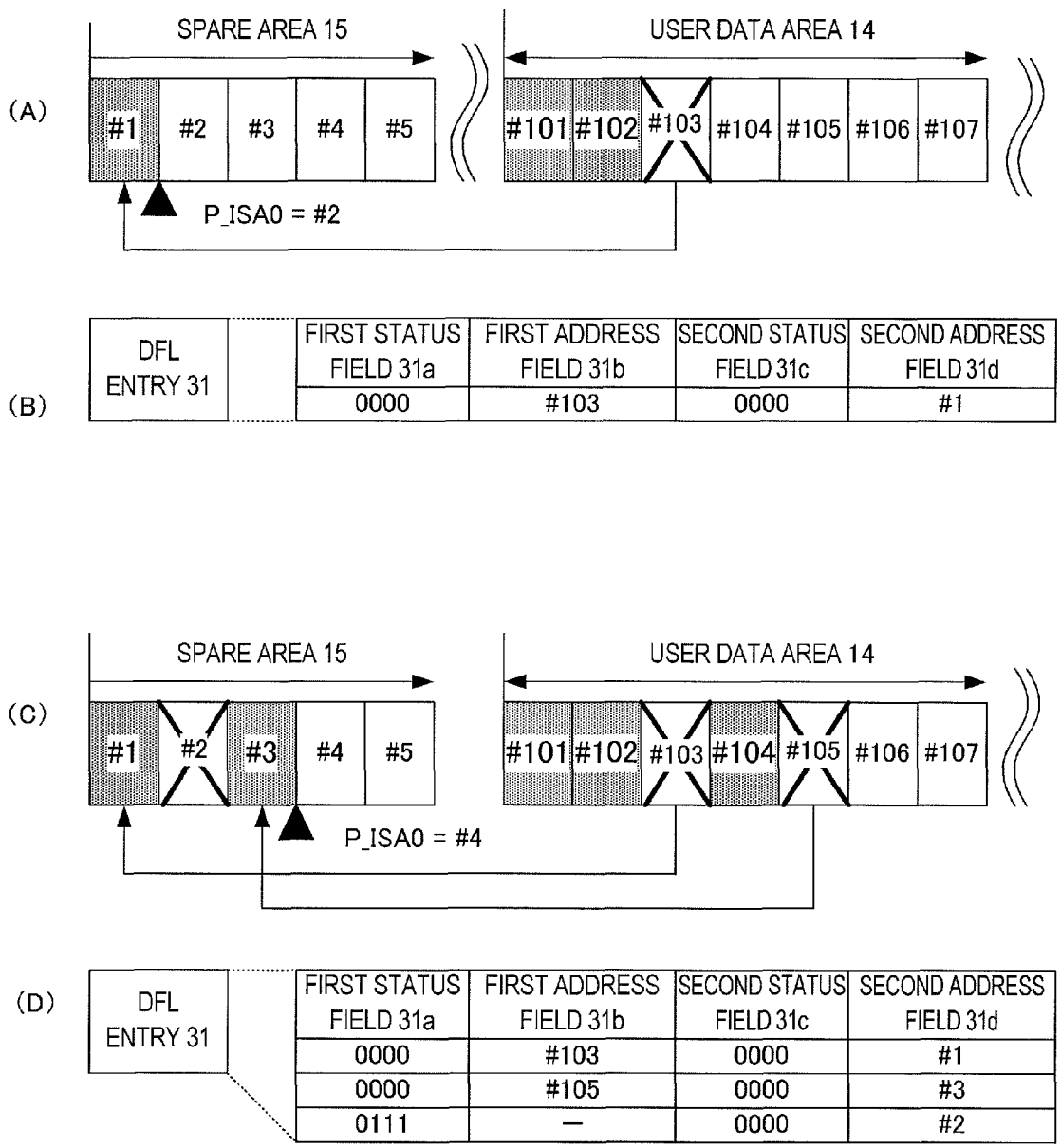
FIGS. 7(A) through 7(D) illustrate specific examples of defect replacement processing as a preferred embodiment of the present invention.

More specifically, FIGS. 7(A) and 7(B) illustrate a situation where a replacement write operation has been performed as a defect has been detected in cluster #103 while a write operation is being performed on a series of clusters that begins with cluster #101, which is the first cluster of the user data area 14. If any defective cluster is detected while the writing section 171 is performing a write operation on the user data area 14, the replacement location calculating section 174 allocates the cluster pointed to by the next available spare location information 43 (see FIG. 3) in the spare area 15 as a replacement cluster that will replace the defective cluster. In the example illustrated in FIGS. 7(A) and 7(B), the next available spare location information 43 points to cluster #1, and therefore, this cluster #1 is allocated as the replacement cluster and the writing section 171 writes that data that should have been written on the defective cluster on that newly allocated replacement cluster instead. At the same time, the management information updating section 175 updates the next available spare location information 43 in the data corresponding to the DFL 21 in the management information storage memory 160 so that the information 43 indicates the location (#2) of the next cluster available from the spare area 15.

If the replacement write operation has been done successfully (i.e., if the cluster that has been allocated as the replacement cluster is a non-defective normal cluster), the management information updating section 175 generates a defect entry 31, of which the first and second address fields 31b and 31d and the first and second status fields 31a and 31c store the defective cluster's location information (#103), the replacement cluster's location information (#1), 0000 (RAD0) indicating that the replacement cluster has been allocated and that the data that should have been written on the defective cluster has been written on the replacement cluster, and 0000 indicating that the second status field 31c has not been used yet, respectively. And then the management information updating section 175 adds the defect entry 31 to the data corresponding to the DFL 21 in the management information storage buffer 160.

That data corresponding to the DFL 21 in the updated management information storage buffer 160 is written by the writing section 171 on the DMA at the arbitrary timing described above.

FIGS. 7(C) and 7(D) illustrate the outcome of a replacement write operation that has been performed in a situation where cluster #105 has turned out to be defective, so has the replacement cluster #2 allocated, while the writing section 171 is performing a write operation on the user data area 14 in the state shown in FIGS. 7(A) and 7(B). Even so, as a replacement cluster for the defective cluster #105 that has been detected in the user data area 14, the replacement location calculating section 174 allocates the cluster #2 in the spare area 15, which is pointed to by the next available spare location information 43, and the writing section 171 performs a replacement write operation on that cluster allocated. At this point in time, the management information updating section 175 updates the next available spare location information 43 for the data corresponding to the DFL 21 in the management information storage memory 160 so that the information 43 indicates the next available cluster location (#3) in the spare area 15. In this case, if the cluster #2 that has been allocated as a replacement cluster has turned out to be a defective cluster, then the replacement location calculating section 174 re-allocates the cluster #3 pointed to by the next available spare location information 43 as a replacement for the cluster #105 and gets a replacement write operation done again by the writing section 171. In that case, the management information updating section 175 generates a defect entry 31, of which the second address field 31d is the cluster #2 that has been detected as a defective cluster in the spare area 15, the first status field 31a is 0111 (UNUSE) indicating that there is a defect in the spare area 15, the first address field 31b is a value representing meaningless data (e.g., all zero data) and the second status field 31c is 0000 indicating that this field is not used yet. Then, the management information updating section 175 newly adds that defect entry 31 to the data corresponding to the DFL 21 in the management information storage memory 160. Also, at the same time, the management information updating section 175 updates the next available spare location information 43 for the data corresponding to the DFL 21 in the management information storage memory 160 so that the information 43 indicates the next available cluster location (#4) in the spare area 15.

If the replacement write operation has been done successfully, the management information updating section 175 generates a defect entry 31, of which the first and second address fields 31b and 31d and the first and second status fields 31a and 31c store the defective cluster's location information (#105), the replacement cluster's location information (#3), 0000 (RAD0) indicating that the replacement cluster has been allocated and that the data that should have been written on the defective cluster has been written on the replacement cluster, and 0000 indicating that the second status field 31c has not been used yet, respectively. And then the management information updating section 175 adds the defect entry 31 to the data corresponding to the DFL 21 in the management information storage buffer 160. In this case, the defect entry 31, which has been sorted in the ascending order except the most significant bit of the first status field 31a, is added to the DFL 21. As a result, the defect entry 31 included in the DFL 21 will have the state shown in FIGS. 7(C) and 7(D).

3-(3) How to Allocate Replacement Cluster (During Physical Reformatting)

Next, the processing to get done during physical reformatting will be described. The following description will be focused on how to allocate a replacement cluster. Also, in the following description, quick certification formatting (which will be referred to herein as "quick certify processing") in which a defect testing process called "certify" is carried out on every defective cluster on the DFL 21 will be described as exemplary physical re-formatting. Specifically, the "quick certify" is processing for determining whether the given cluster is a defective cluster or not by seeing if predetermined data written on that cluster can be properly read and retrieved. A cluster that has been determined to be defective as a result of the quick certify processing will be stored as a defect entry 31 in the DFL 21. Specifically, the defective cluster in user data area 14 will be stored as a defect entry 31, of which the first status field 31a has either 0000 (RAD0) attribute or 1000 (RAD1) attribute, and the defective cluster in the spare area 15 will be stored as a defect entry 31, of which the first status field 31a has 0111 (UNUSE) attribute.

Figure 8:
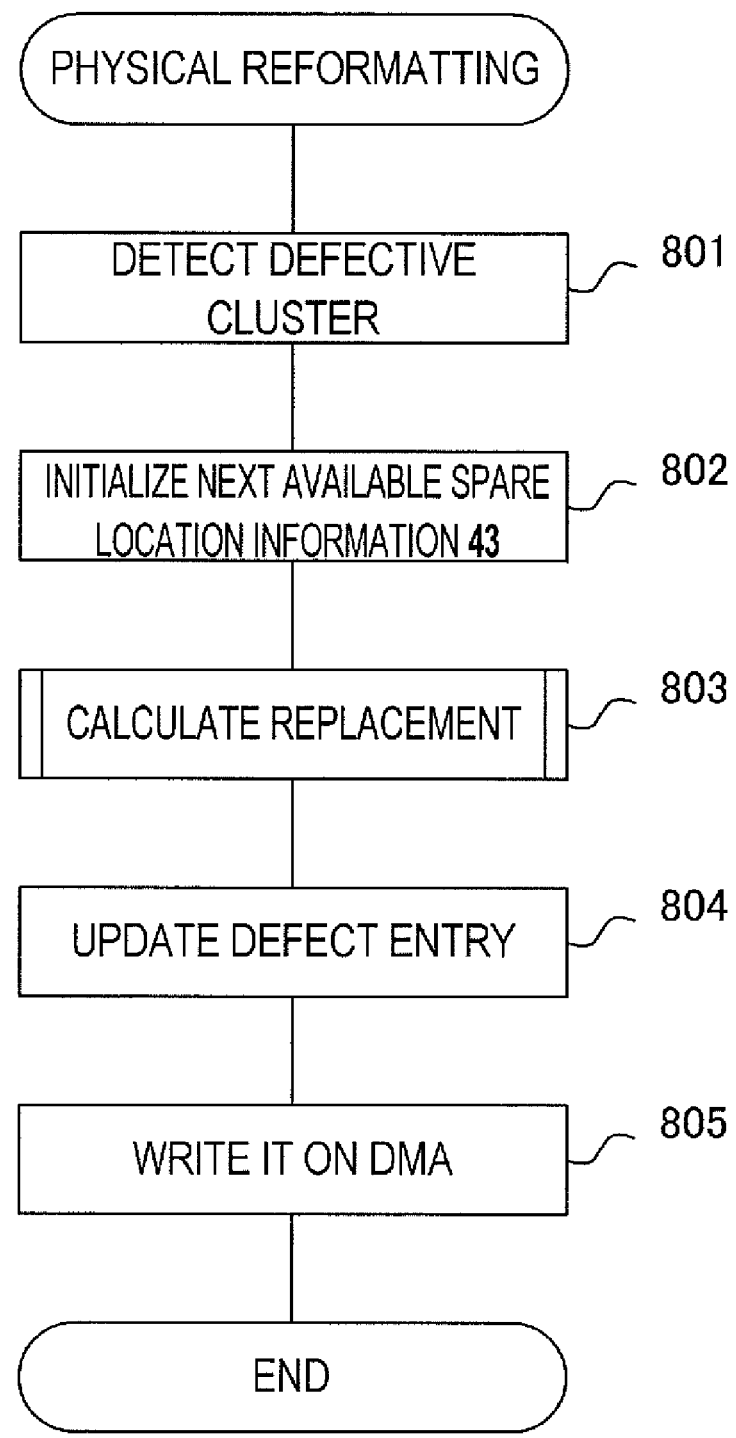
FIG. 8 is a flowchart showing the procedure of physical reformatting as a preferred embodiment of the present invention.

FIG. 8 is a flowchart showing the procedure of the physical reformatting processing.

First, in Step 801, a defective cluster is searched for. Specifically, first, the format control section 173 detects defective clusters in the spare area 15 and user data area 14 of the optical disc 1. If the quick certify processing is carried out to detect them, for example, the writing section 171 and the reading section 172 subject the defective clusters on the DFL 21 to a defect testing process (i.e., certify processing), thereby determining whether those clusters are really defective or not.

If those clusters are determined to be non-defective, then the defect information updating section 175 deletes defect entries 31 including those clusters from the DFL 21 (more exactly, from the data corresponding to the DFL 21 in the management information storage memory 160). On the other hand, if those clusters are found to be defective, then information about those defective clusters could be stored in the memory 150.

Next, in Step 802, the next available spare location information 43 is initialized. Specifically, the format control section 173 instructs the management information updating section 175 to update the next available spare location information 43 for the DFL 21 in the management information storage memory 160 so that the information 43 is initialized in the direction in which the spare area 15 is used. More specifically, if the spare area 15 is used in the ascending order of physical addresses (i.e., a cluster with the smallest physical address is used first and a cluster with the largest physical address last), then the next available spare location information 43 is initialized so as to point to the location of a cluster with the smallest physical address in the spare area 15.

Next, in Step 803, a replacement cluster is calculated (or re-allocated). Specifically, the format control section 173 gets replacement clusters re-allocated to defective clusters in the user data area 14 by the replacement location calculating section 174 so that the replacement clusters are used on a first come, first use basis in the direction in which the spare area 15 is used (i.e., so that non-defective available clusters are allocated sequentially from the top in the direction in which the spare area 15 is supposed to be used).

This processing step will be described in further detail.

Figure 9:
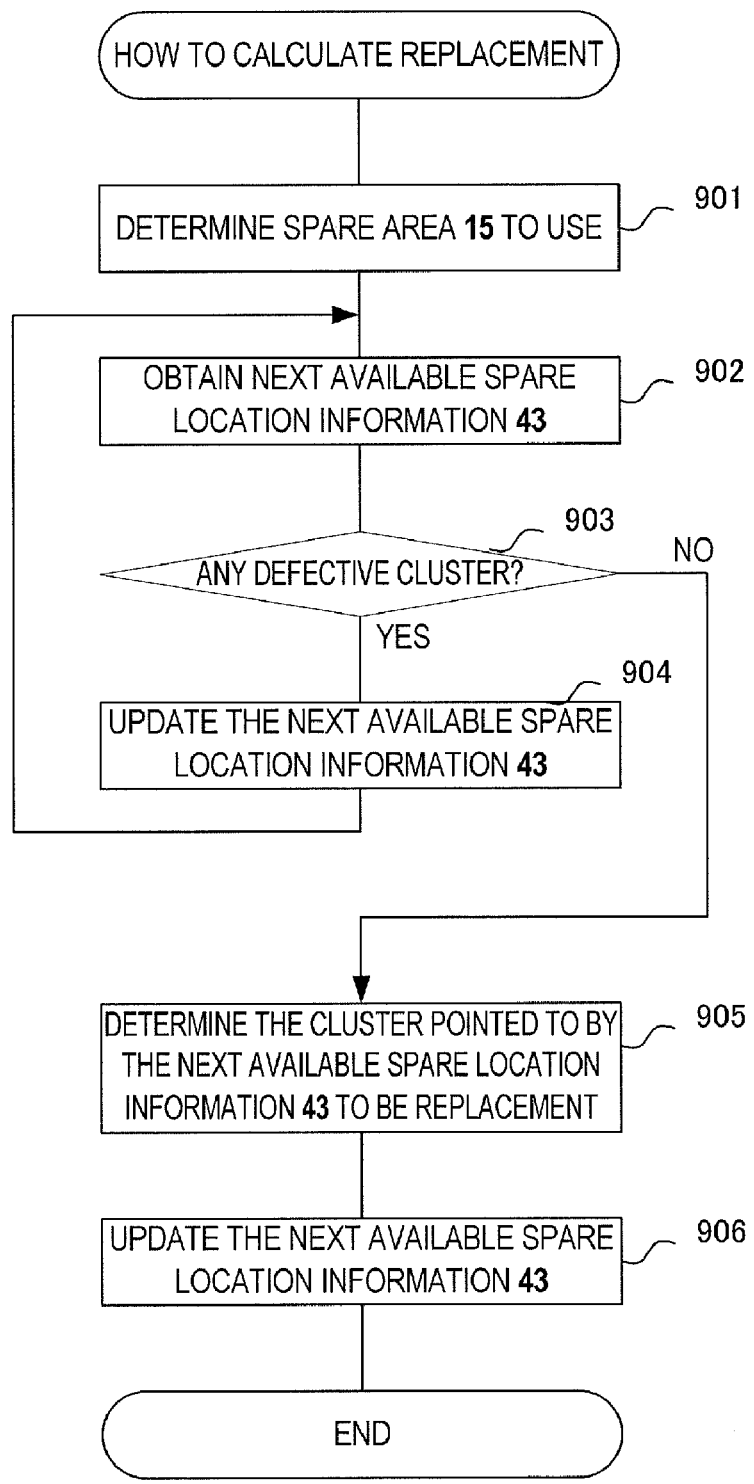
FIG. 9 is a flowchart showing the procedure of a replacement cluster allocating process as a preferred embodiment of the present invention.

FIG. 9 is a flowchart showing the procedure in which the replacement location calculating section 174 calculates a replacement cluster.

First, in Step 901, a spare area 15 to find a replacement cluster in is determined. Specifically, the replacement location calculating section 174 calculates a spare area 15, from which a replacement cluster can be allocated. According to this first preferred embodiment of the present invention, there is only one spare area 15, and therefore, there is no choice but to use that spare area 15.

Optionally, at this point in time, it may also be determined whether the spare area 15 has been used up or not as will be described later.

Next, in Step 902, the value of the next available spare location information 43 is obtained. Specifically, the replacement location calculating section 174 gets the next available spare location information 43 from the data corresponding to the DFL 21 in the management information storage memory 160.

Subsequently, in Step 903, it is determined whether the cluster pointed to by the next available spare location information 43 is a defective cluster or not. Specifically, the replacement location calculating section 174 determines whether or not the cluster location (i.e., physical address) pointed to by the next available spare location information 43 is included in the defective cluster that has been detected in the processing 801 described above. More specifically, the replacement location calculating section 174 determines whether or not the defect entry 31 including, as a defective cluster location, a physical address location indicated by the next available spare location information 43 is included in the DFL 21 (more particularly, the data corresponding to the DFL 21 in the management information storage memory 160). In that case, the defect entry 31 to be compared to when making a decision is either a defect entry 31 for the spare area 15, of which the first field 31a is 0111 (UNUSE), or a defect entry 31, of which the first and second status fields 31a and 31c are 0010 (SPR) and 0100, respectively.

It should be noted that a defect entry 31 for a cluster that has been determined to be a defective cluster in the spare area 15 in the processing step 801 could been updated into a defect entry 31, of which every field has UNUSE attribute (i.e., the first status field 31a is 0111), by the management information updating section 175. In that case, only the defect entry 31 with the UNUSE attribute (i.e., the first status field 31a of which is 0111) needs to be compared to when it is determined whether or not the cluster pointed to by the next available spare location information 43 happens to be a defective cluster.

The cluster to be treated as a defective cluster in this processing step is supposed to be registered as a defect entry 31, of which the first status field 31a is 0111 (UNUSE) that is an attribute for managing a defective cluster in the spare area 15. However, as another attribute for managing a defective cluster in the same spare area 15, there is also a defect entry 31, of which the first status field 31a is 0010 (SPR) and the second status field 31c is 0100 (which will be referred to herein as an "SPR (RDE) attribute"). The clusters managed by the defect entry 31 with the UNUSE attribute have already turned out to be defective clusters as a result of a defect testing process during the physical reformatting (i.e., non-usable clusters). On the other hand, such clusters managed by the defect entry 31 with the SPR (RDE) attribute could have had their defect repaired (i.e., clusters that could be usable and that will be referred to herein as "provisionally defective clusters").

If there is any defect entry 31 with the SPR (RDE) attribute left on the DFL 21 when the processing step 903 is done (i.e., even after the defective cluster has been detected by quick certify processing), that cluster will also be treated as a defective cluster. On the other hand, if a replacement cluster is allocated during a normal write operation as will be described later in 3-(4), a cluster managed with the UNUSE attribute has already turned out to be a defective cluster, and therefore, the decision needs to be made so that such a cluster is not used as a replacement cluster. However, as a cluster managed with the SPR (RDE) attribute is a provisionally defective cluster, such a cluster may be treated either not to be allocated as a replacement cluster (i.e., not to be used) just like a cluster with the UNUSE attribute or to be allocated as a replacement cluster (i.e., as a usable cluster) if it is preferred to count on the probability that the cluster may have had its defect repaired. That is to say, just like the cluster with the UNUSE attribute, it is determined whether or not the next available spare location information 43 agrees with the defect entry 31 with the SPR (RDE) attribute. If the answer is YES and if the cluster will not be allocated as a replacement cluster, then that cluster will be treated like the one with the UNUSE attribute. But if the cluster will be allocated as a replacement cluster anyway, then the cluster may be treated as being usable as a replacement cluster with the defect entry 31 with the SPR (RDE) attribute deleted. In that case, if a replacement write operation can get done properly on the replacement cluster that has been managed as a defect entry 31 with the SPR (RDE) attribute, a defect entry 31 with the RAD0 attribute, including that replacement cluster, will be registered. On the other hand, if the replacement cluster has been determined to be defective during the replacement write operation, this cluster will be registered as a defect entry 31 with the UNUSE attribute.

The processing step 903 of determining whether the given cluster is a defective cluster or not may be performed by seeing if the cluster pointed to by the next available spare location information 43 agrees with every defect entry 31 with the UNUSE attribute (or the SPR (RDE) attribute) each time. Alternatively, before the replacement write operation is performed (e.g., while the disc is being loaded), a defect entry 31 indicating a defective cluster, which is located either exactly at the cluster location indicated by the next available spare location information 43 or next and posterior to the cluster pointed to by the next available spare location information 43 in the direction in which the spare area 15 is used, may have its location determined and stored in the memory 150 as comparative entry location information. In this case, if the spare area 15 is used in the ascending order of physical addresses, that defective cluster has a larger physical address than, and is located closest to, the cluster location indicated by the next available spare location information 43. Then, in Step 903, it may just be determined whether the cluster pointed to by the next available spare location information 43 agrees with the defective cluster to be managed with the defect entry 31 indicated by the comparative entry location information that has been stored. In that case, if it has been determined that those clusters agree with each other, then the comparative entry location information is updated so as to point to the next defective cluster 31 in the direction in which the spare area 15 is used.

It should be noted that the comparative entry location information should be stored for every defect attribute to compare. Also, if there are multiple spare areas 15, the comparative entry location information should be retained for every defect attribute in each of those spare areas 15. And in Step 903, the comparative entry location information is compared to the one for the spare area 15 that has been determined to use in Step 901.

Next, in Step 904, if it has been determined that those clusters agree with each other, the next available spare location information 43 is updated. Specifically, the replacement location calculating section 174 gets the next available spare location information 43 updated by the management information updating section 175 so that the information 43 points to the next cluster with the defective cluster avoided. In this case, if the spare area 15 is used in the ascending order of physical addresses, the information 43 is updated so as to point to the "next" cluster that has a larger physical address than the cluster that has been determined to agree with the defective cluster. Then, the process goes back to the processing step 902.

In this case, the next available spare location information 43 is supposed to be updated so as to point to the next cluster with the defective cluster avoided. This update can get done in one of the following two ways.

Specifically, one of the two ways is to update the next available spare location information 43 on a cluster-by-cluster basis so that the information 43 simply indicates the cluster location that is very next to that agreeing cluster. According to the other method, if it has been determined that the two clusters agree with each other, it is determined whether or not there is any series of defective clusters that start with that defective cluster. If the answer is YES, then the information is updated so as to point to the next cluster that follows that series of defective clusters (i.e., to point to the next normal cluster). In the example to be described below, the former method is supposed to be adopted. However, any of these two methods may be used.

Also, if the latter method is adopted, it is not always necessary to go back to the processing step 902 but the process may advance directly to the next processing step 905.

Next, in Step 905, the cluster pointed to by the next available spare location information 43 is determined to be the replacement cluster. Specifically, the replacement location calculating section 174 determines the cluster pointed to by the next available spare location information 43 to be the replacement cluster.

Finally, in Step 906, the next available spare location information 43 is updated. Specifically, the replacement location calculating section 174 gets the next available spare location information 43 updated by the management information updating section 175 so that the information 43 indicates the cluster location next to the replacement cluster allocated.

In this case, the next available spare location information 43 is supposed to be updated so as to point to the cluster next to the replacement cluster allocated. This update can get done in one of the following two ways. One of the two ways is to update the next available spare location information 43 so that the information 43 simply indicates the cluster location that is very next to that cluster allocated. According to the other method, it is determined, at this point in time, whether the cluster next to the cluster allocated is registered as a defective cluster with the DFL 21, and the next available spare location information 43 is updated so as to indicate a next available cluster location that comes after the cluster allocated. In this example, the former method is supposed to be adopted. However, any of these two methods may be used.

By performing these processing steps, the spare area 15 to be allocated as a replacement and the replacement cluster are determined.

Although not described in detail, the next available spare location information 43 could indicate a location outside of the spare area 15. More specifically, in some cases, every cluster in the spare area 15 could be used up and no other cluster to be allocated as a replacement cluster could be left anymore. In that case, the next available spare location information 43 could indicate the first cluster location of the user data area 14 that follows the end of the spare area 15 in the optical disc 1 shown in FIG. 2, for example. In other words, if the next available spare location information 43 indicates a cluster location (or physical address) that is not inside of a spare area 15, then it can be determined that that spare area 15 has been used up (i.e., exhausted). Examples of alternative methods for indicating that the spare area 15 is not available (i.e., has been used up) include setting a predetermined value indicating such an exhausted state (e.g., a hexadecimal number FFFFFFFF or all zero data (00000000)) for the next available spare location information 43 and separately providing a spare exhaustion flag for the DDS 20, for example, and determining that the spare area has been used up if that flag is ON.

That is why in finding the replacement, it is determined, either before the processing step 905 is performed or when the processing step 902 is performed, whether the location indicated by the next available spare location information 43 is inside of the spare area 15 or if the spare area 15 is already exhausted (or full). If that spare area 15 has been determined to be full but if at least one of other spare areas 15 is available, then the processing described above is carried out on that spare area 15. On the other hand, if there are no other spare areas 15 available anymore, then the processing step of regarding the replacement allocation process as a failure and the format processing itself as an error should be performed.

Also, if the spare area 15 is determined to be full (e.g., if the next available spare location information 43 updated in Step 906 indicates a location outside of the spare area 15), then the processing step of setting a predetermined value indicating the exhausted state for the next available spare location information 43 or providing a spare exhaustion flag needs to be performed when the processing step 906 is carried out, for example.

Then, in Step 804, the defect entry 31 is updated. Specifically, the format control section 173 gets the defect entry 31, including the defective cluster that has been detected in Step 801, changed (or updated) by the management information updating section 175.

More specifically, if the cluster that has been detected as a defective cluster in the processing step 801 is located within the user data area 14 (i.e., if the first status field 31a is 0000 (RAD0), 1000 (RAD1), 0100 (PBA) or NRD (0001)), then a defect entry 31 with the RAD0 attribute, in which the defective cluster detected is put into the first address field 31b, the replacement cluster that has been re-allocated in Step 803 is put into the second address field 31d, the first status field 31a is 0000 (RAD0) and the second status field 31c is 0000 (unused), is registered and the data corresponding to the DFL, 21 in the management information storage memory 160 is modified and updated.

In the example described above, the defect entry is supposed to be registered as having the RAD0 attribute. However, the defect entry could also be registered as having the RAD1 attribute.

Also, in the example described above, the defect entry 31 with the PBA attribute or the NRD attribute is supposed to have its attribute changed into RAD0 attribute. However, their attribute does not always have to be changed into the RAD0 attribute. Alternatively, the defect entry 31 with the NRD attribute could keep its attribute unchanged and the defect entry 31 with the PBA attribute could have its attribute modified and updated into the NRD attribute, for example.

Furthermore, if the cluster that has been detected as a defect in Step 801 is located within the spare area 15 (i.e., if its first status field 31a is 0111 (UNUSE) or if its first and second status fields 31a and 31c are 0010 (SPR) and 0100, respectively), then the data corresponding to the DFL 21 in the management information storage memory 160 is modified and updated so that the defective cluster detected is a defect entry 31 with the UNUSE attribute, which includes the defective cluster detected in its second address field 31d and of which the first status field 31a is 0111 (UNUSE), the first address field 31b is all zero (unused) and the second status field 31c is 0000 (unused).

Finally, in Step 805, the management information is written on the DMA. Specifically, the format control section 173 gets the data corresponding to the latest DFL 21 and the data corresponding to the DDS 20, which have been updated in Step 804 and which are now stored in the management information storage memory 160, written by the writing section 171 on DMA1 through DMA4.

The physical reformatting processing gets done by performing these processing steps.

Hereinafter, it will be described what it means by re-allocating replacement clusters on a first come, first use basis in the direction in which the spare area 15 is used (i.e., sequentially allocating the clusters from the first one in that using direction) as described for the processing step 803.

FIGS. 10(A) through 10(F) illustrate a situation where replacement clusters are not re-allocated and a situation where replacement cluster are re-allocated when quick certify processing is performed.

Figure 10:
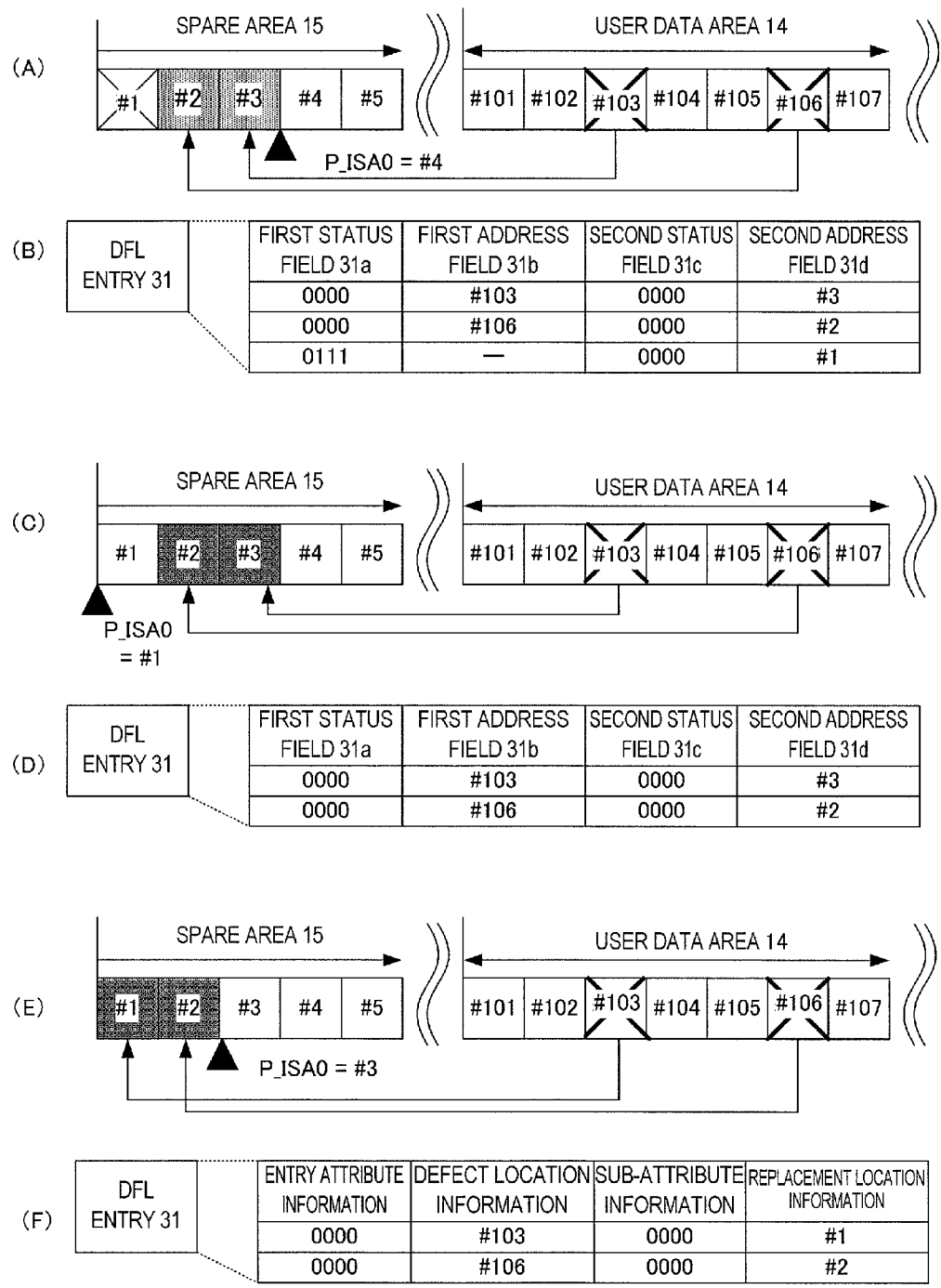
FIGS. 10(A) through 10(F) show how to perform replacement re-allocating processing during physical reformatting according to a preferred embodiment of the present invention.

FIGS. 10(A) and 10(B) illustrate a state (i.e., the initial state) of the optical disc 1 yet to be subjected to the quick certify processing. For example, in that state, clusters #103 and #106 in the user data area 14 have been respectively replaced with clusters #3 and #2 in the spare area 15, and are registered as a defect entry 31 with the RAD0 attribute with the DFL 21. On the other hand, cluster #1 in the spare area 15 has been determined to be a defective cluster during the replacement write operation and is registered as a defect entry 31 with the UNUSE attribute with the DFL 21. Also, in this case, the next available spare location information 43 points to cluster #4.

The quick certify processing is carried out on the optical disc 1 in such a state. Suppose a situation where the cluster #1 of the spare area 15 that has been determined to be a defective cluster turns out to have had its defect repaired when subjected to the certify processing.

FIGS. 10(C) and 10(D) illustrate a state of the optical disc 1 that has been subjected to the quick certify processing in a situation where no replacement clusters are re-allocated.

Since the cluster #1 has turned out to be a normal cluster as a result of the certify processing, the defect entry 31 with the UNUSE attribute for the cluster #1 has been deleted from the DFL 21. Also, since the physical reformatting has been carried out, the next available spare location information 43 (P_ISA0 shown in FIG. 10(C)) is initialized (which corresponds to the processing step 802 described above). Specifically, supposing that cluster is the first one in the direction in which the spare area 15 is used (i.e., supposing the spare area 15 is used in the ascending order of physical addresses), the next available spare location information 43 is initialized so as to point to the cluster that has the smallest physical address in the spare area 15 (i.e., the cluster #1 in this case).

According to this method, however, the defect entries 31, to which replacements have already been allocated before the quick certify processing is started, are left as they are. Consequently, the next available spare location information 43 points to that cluster #1 and yet there are some clusters that have already been allocated as replacements beyond that location in the using direction.

In such a situation, if another defect is detected and a replacement cluster should be allocated to it while a write operation is being performed on the rest of the user data area 14, it should be determined whether or not the cluster pointed to by the next available spare location information 43 can be used as a replacement. In that case, not only the defective cluster locations registered as having the UNUSE attribute (and the SPR (RDE) attribute) but also clusters in the spare area 15, which have already been used as replacements as indicated by the second address field 31d with the RAD or RAD1 attribute, need to be checked out as well. As described above, in the DFL 21, the defect entries 31 have been sorted out in the ascending order according to their attribute. That is why as for the cluster with the UNUSE attribute, that attribute can be searched for a matching address by either two-branched searching or defining a defect entry 31 compare during the disc loading process and then comparing it to that defect entry 31 as described above. As for the cluster with the RAD (RAD1) attribute, on the other hand, the defect entries 31 have been sorted by reference to their first address field 31b. For that reason, to check out the second address field 31d of the cluster with the RAD0 (or RAD1) attribute, it cannot be determined whether the cluster has been used yet or not unless every defect entry with the RAD0 (or RAD1) attribute is searched. In that case, the greater the number of defect entries 31 included in the DFL 21, the longer it will take to just calculate replacement clusters that can be allocated and the lower the performance of replacement writing would be.

FIGS. 10(E) and 10(F) illustrate a state of the optical disc 1 that has already been subjected to the quick certify processing in a situation where a replacement cluster has been re-allocated.

Since the cluster #1 has turned out to be a normal cluster as a result of the certify processing, the defect entry 31 with the UNUSE attribute for the cluster #1 has been deleted from the DFL 21. Also, since the physical reformatting has been carried out, the next available spare location information 43 is initialized (which corresponds to the processing step 802 described above and which is initialized so as to point to the cluster #1 in this case).

Subsequently, replacement clusters are re-allocated as in Steps 803 (see FIG. 9) and 804. Supposing the certify processing is sequentially performed in the ascending order of physical addresses (i.e., starting with a cluster with the smallest address), first of all, the cluster #1 pointed to by the next available spare location information 43 is re-allocated as a replacement cluster for the cluster #103 in the user data area 15. At this point in time, the next available spare location information 43 is updated so as to point to the next cluster #2. Next, that cluster #2 pointed to by the next available spare location information 43 is re-allocated as a replacement cluster for the cluster #106 in the user data area 15. At this point in time, the next available spare location information 43 is updated so as to point to the next cluster #3. Consequently, after the quick certify processing shown in FIGS. 10(E) and 10(F) has been done, the next available spare location information 43 points to the cluster #3.

In such a situation, if another defect is detected and a replacement cluster should be allocated to it while a write operation is being performed on the rest of the user data area 14, it should be determined whether or not the cluster pointed to by the next available spare location information 43 can be used as a replacement. In that case, it is only necessary to see if it is registered with the UNUSE attribute (and the SPR (RDE) attribute). That is to say, there is no need to care about whether it has been used as a replacement cluster yet as in the situation shown in FIGS. 10(C) and 10(D). As a result, the replacement clusters that can be allocated can be certified smoothly, which is beneficial.

In the example described above, a defect entry 31 that has been confirmed, by the quick certify processing, as having been processed successfully is supposed to be deleted from the DFL 21 and the other defect entries 31 are supposed to be left as they are. However, this procedure is only an example and the quick certify processing does not always have to be performed in that procedure. Specifically, it is naturally possible to get information about the defective cluster that has been detected in Step 801 retained (or saved) in a different form in the memory 150, for example, initialize the data corresponding to the DFL 21 in the management information storage memory 160 when the next available spare location information 43 is initialized in Step 802, and then register the defect entry 31, including information about the defective cluster that has been retained in the memory 150, with the DFL 21 all over again in Step 804.

Alternatively, before the certify processing is carried out, information about the cluster to be certified may be retained (or saved) in the memory 150 in a different form from the DFL 21. The certify processing may be carried out based on that information in Step 801 and then clusters that have been determined to be non-defective as a result of the certify processing may be deleted from the memory. Still alternatively, information about the cluster that has been determined to be defective as a result of the certify processing may be retained in another different form in the memory 150. When the next available spare location information 43 is initialized in Step 802, the data corresponding to the DFL 21 in the management information storage memory 160 may also be initialized. And then the defect entry 31, including information about the defective cluster that has been retained in the memory 150, may be registered with the DFL 21 all over again in Step 804.

In the foregoing description, the present invention has been described as being applied to the quick certify processing. However, the present invention can also be carried out in the same procedure even by a different kind of physical reformatting processing.

Specifically, if full certification formatting for performing the certify processing on the entire surface of the disc (i.e., the data area 5 thereof) is carried out, the data corresponding to the DFL 21 in the management information storage buffer 160 is initialized at a certain point in time (e.g., before the processing step 801 is performed). Next, in Step 801, every cluster on the disc (i.e., on the data area 5) is subjected to the certify processing and then information about defective clusters detected is stored as the data corresponding to the DFL 21 (or in the memory 150). The rest of the processing may be carried out in exactly the same procedure as what has already been described above.

Still alternatively, even quick reformatting processing in which the defect attribute of a defect entry 31 registered with the DFL 21 is changed into an attribute indicating that the defect may have already been repaired (i.e., the second status field 31*c* of the defect entry 31 is changed into 0100) can also get done in the same procedure as what has already been described above, except the following respects. First of all, in the detecting processing step 801, nothing is performed in particular but every defective cluster, registered as a defect entry 31 with the current DFL 21, is treated as a defect. Secondly, there is no need to carry out the replacement calculating processing step 803 anymore. Furthermore, if the processing step 804 of updating the defect entry 31 is carried out on a defective cluster in the user data area 14, the defect entry 31 to register is modified into a defect entry 31, of which the first status field 31*a* is 0100 (PBA), the first address field 31*b* represents the physical address of the defective cluster, the second status field 31*c* is 0100, and the second address field 31*d* represents the number of consecutive defective clusters. On the other hand, if the processing step 804 is carried out on a defective cluster in the spare area 15, the defect entry 31 to register is modified into a defect entry 31, of which the first status field 31*a* is 0010 (SPR), the first address field 31*b* is all zero, the second status field 31*c* is 0100, and the second address field 31*d* represents the physical address of the defective cluster.

Also, although not mentioned particularly in the foregoing description, if the quick certify processing is carried out, every defective cluster on the DFL 21 could be subjected to the certify processing in advance in Step 801 and then the processing step 802 and the rest of the process could be performed. Alternatively, the series of processing steps 801 through 804 could be performed on the target defective clusters on a one by one basis. In this case, if the formatting processing is carried out, the processing step 802 of initializing the next available spare location information 43 needs to be performed only once before the processing step 803. That is to say, even with the latter method in which the series of processing steps 801 through 804 is performed on the target defective clusters one by one, only the processing step 802 needs to be performed just once in the first cycle and will never be performed again after that.

As the cluster to be re-allocated as a replacement cluster in the processing step 803 should be a non-defective, normal cluster, it could be said that the defective clusters in the spare area 15 should have been certified before the processing step 803 is performed. More specifically, as replacements for the clusters that have been detected as defective in the user data area 14, the clusters in the spare area 15 should be allocated on a first come, first use basis with the defective clusters avoided.

Thinking that way, when the processing step 801 is performed, the defect detection processing steps such as the certify processing may be performed on the user data area 14 and on the spare area 15. In that case, after the certify processing has been carried out on the defective clusters in the spare area 15, the certify processing could be performed on the defective clusters in the user data area 14. Alternatively, after every defective cluster in the spare area 15 has been certified and determined as such in the processing step 801, the defective clusters in the user data area 14 could all be certified in the processing step 801 at a time. Or the series of processing steps 801 through 804 could be performed on the target defective clusters one by one.

Still alternatively, even in a situation where the series of processing steps 801 through 804 are performed on every defective cluster, including the ones in the spare area 15, on a one-by-one basis, if the given cluster agrees with the defective cluster in Step 903 and if that defective cluster has not been certified yet, then that cluster may be certified. And if that cluster has turned out to have no problem as a result, then that cluster could be calculated as a replacement cluster.

It should be noted that the processing steps 801 and 802 do not always have to be carried out in this order. That is to say, before the defective clusters are detected, the next available spare location information 43 could be initialized, too.

3-(4) How to Allocate Replacement Clusters (During Normal Writing)

Hereinafter, it will be described how to allocate a replacement cluster to a defective cluster that has been detected while a write operation is performed on the user data area 14 of an optical disc 1 that has been subjected to the physical reformatting.

In that case, the processing can get done in the same procedure as in the step 803 of the physical reformatting processing that has already been described with reference to FIG. 9 for the section 3-(3).

FIGS. 11(A) through 11(F) illustrate how to perform the replacement cluster calculation processing with possible presence of defect entries 31 of the spare area 15 taken into account.

Figure 11:
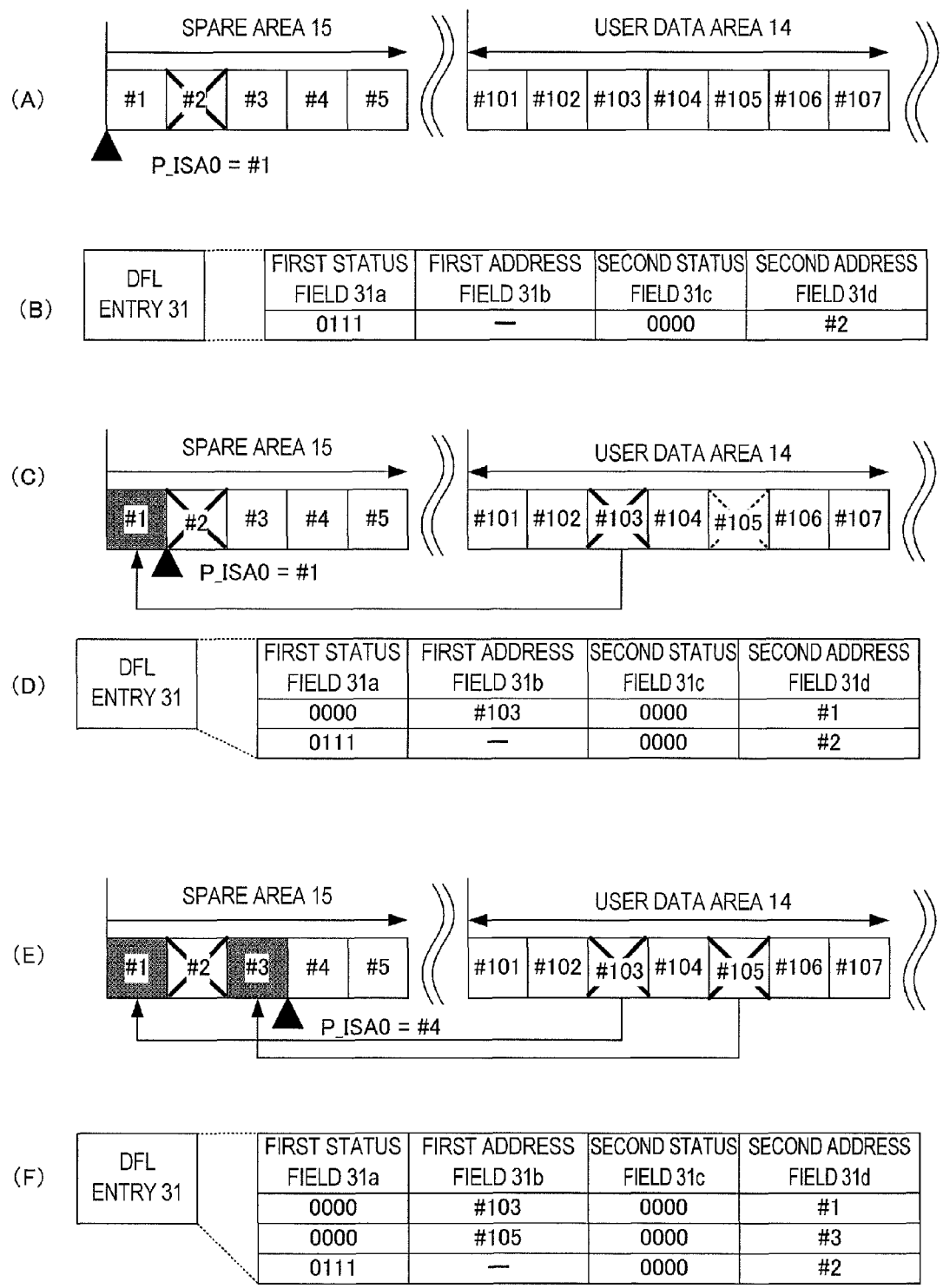
FIGS. 11(A) through 11(F) show how to perform replacement allocating processing during physical reformatting according to a preferred embodiment of the present invention.

FIGS. 11(A) and 11(B) illustrate a state (i.e., the initial state) of an optical disc 1 that has just been subjected to the physical reformatting (i.e., the quick certify processing). As a result of the quick certify processing, only the cluster #2 in the spare area 15 has been determined to be a defective cluster, which is registered as a defect entry 31 with the UNUSE attribute with the DFL 21. Also, after the physical reformatting processing has been done, the next available spare location information 43 has been initialized so as to point to cluster #1 as the spare area 15 is supposed to be used in the ascending order of physical addresses.

FIGS. 11(C) and 11(D) illustrate a state of the optical disc 1 in which cluster #103 has been newly detected as a defective cluster while a write operation is being performed on the user data area 14 of the optical disc 1 in the state shown in FIGS. 11(A) and 11(B) and then subjected to a replacement write operation. In that case, according to the flowchart shown in FIG. 9, Step 901 of defining the spare area 15 to use (ISA0);
Step 902 of getting next available spare location information 43 (that points to cluster #1);
Step 903 of determining that cluster #1 is not registered with the DFL 21;
Step 905 of determining the cluster #1 pointed to by the next available spare location information 43 to be a replacement cluster; and
Step 906 of updating the next available spare location information 43 (so that the information 43 points to cluster #2)

are performed. The cluster #1 pointed to by the next available spare location information 43 is not registered as a defective cluster with the DFL 21 and therefore can be used as a replacement cluster as it is. As a result, a defect entry 31, of which the first and second address fields 31b and 31d are #103 and #1 representing the defective cluster and the replacement cluster, respectively, and the first status field 31a is 0000 (RAD0), is newly added to the DFL 21. Also, the next available spare location information 43 is updated so as to indicate the cluster location (#2) that is next to the cluster that has been allocated as a replacement cluster.

FIGS. 11(E) and 11(F) illustrate a state of the optical disc 1 in which cluster #105 has been newly detected as another defective cluster while a write operation is being performed on the user data area 14 of the optical disc 1 in the state shown in FIGS. 11(C) and 11(D) and then subjected to a replacement write operation. In that case, according to the flowchart shown in FIG. 9, Step 901 of defining the spare area 15 to use (ISA0);
Step 902-1 of getting next available spare location information 43 (that points to cluster #2);
Step 903-1 of determining that cluster #2 is registered with the DFL 21;
Step 904 of updating the next available spare location information 43 (so that the information 43 points to cluster #3)
Step 902-2 of getting the next available spare location information 43 (that points to cluster #3);
Step 903-2 of determining that cluster #3 is not registered with the DFL 21;
Step 905 of determining the cluster #3 pointed to by the next available spare location information 43 to be a replacement cluster; and
Step 906 of updating the next available spare location information 43 (so that the information 43 points to cluster #4)

are performed. The cluster #2 pointed to by the next available spare location information 43 first is registered as a defective cluster with the DFL 21, and therefore, the next cluster #3 is selected as a replacement cluster. As a result, a defect entry 31, of which the first and second address fields 31b and 31d are #105 and #3 representing the defective cluster and the replacement cluster, respectively, and the first status field 31a is 0000 (RAD0), is newly added to the DFL 21. Also, the next available spare location information 43 is updated so as to indicate the cluster location (#4) that is next to the cluster that has been allocated as a replacement cluster.

As described above, in the recording method and apparatus of the present invention, a replacement cluster in a spare area is allocated by reference to next available spare location information 43 and a defect entry 31 and then the next available spare location information 43 is updated.

On the other hand, in the reproducing method and apparatus of the present invention, when user data is read, a replacement cluster that has been allocated by the recording method or apparatus described above is scanned instead of a defective cluster, thereby retrieving the necessary information.

Figure 19:
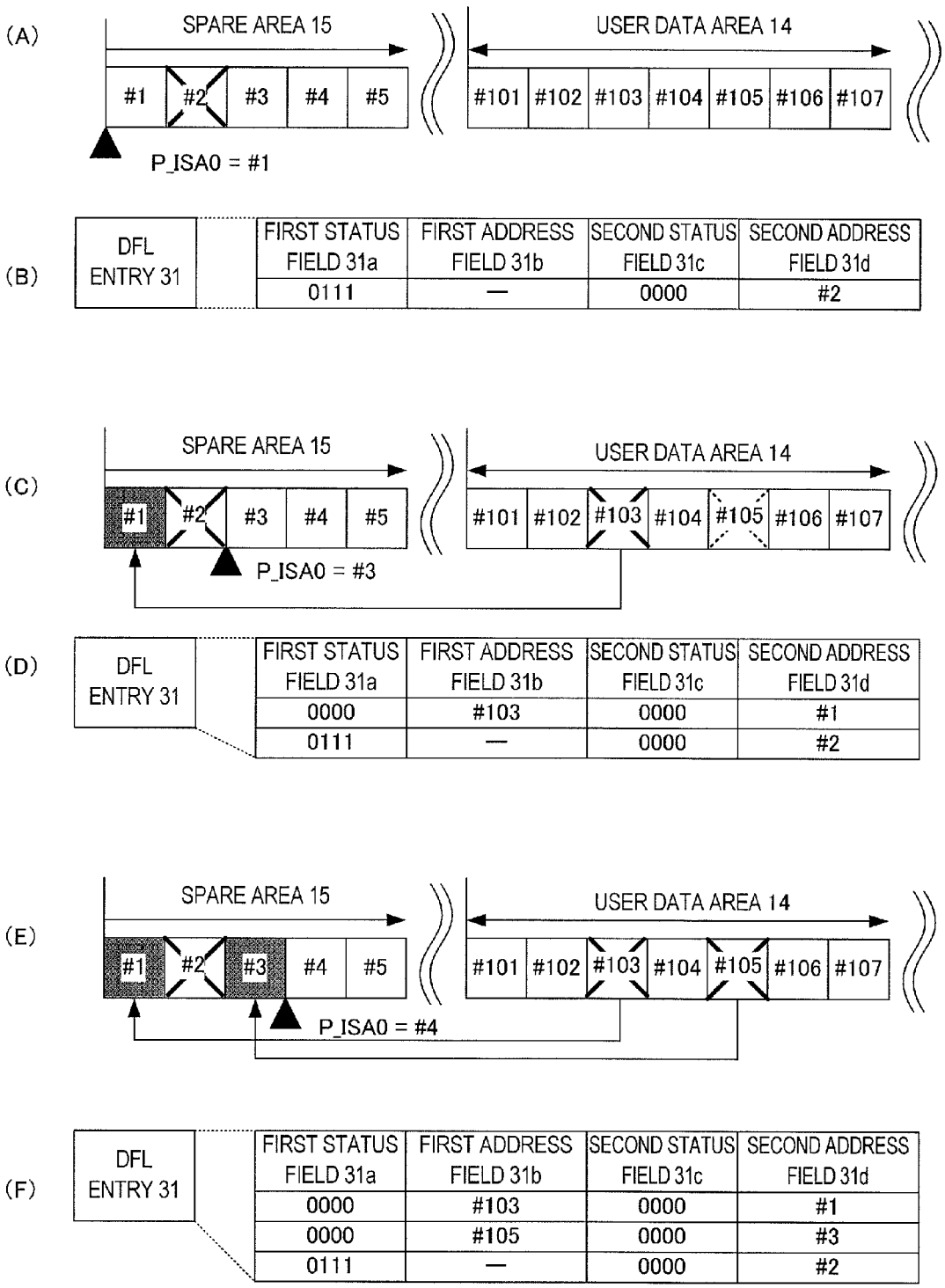
FIGS. 19(A) through 19(F) show how to perform replacement allocating processing after physical reformatting according to a preferred embodiment of the present invention.

In the example described above, in the processing step 906 of updating the next available spare location information 43, the information 43 is supposed to be updated to indicate a cluster location next to the cluster that has been allocated as a replacement cluster. And the processing step 903 of calculating the replacement cluster is supposed to include seeing if the cluster location indicated by the next available spare location information 43 is registered as a defective cluster with the DFL 21. However, the processing step 906 of updating the next available spare location information 43 does not have to be carried out just as described above. That is to say, the same effect will naturally be achieved even by determining whether the cluster location indicated by the updated information 43 is a defective cluster or not (e.g., whether it is registered with the DFL 21 as a defect entry 31 with the UNUSE attribute) when the processing step 906 of updating the next available spare location information 43 is performed and by controlling the next available spare location information 43 so that the location indicated by the information 43 in the processing step 906 is always a normal (usable) cluster location in the spare area 15, not a defective cluster. For example, if the cluster location (#2) next to the cluster that has been allocated as a replacement cluster for a defective cluster turns out to be a defective cluster, then the next available spare location information 43 is updated not to point to the cluster #2 that is registered as a defective cluster with the UNUSE attribute with the DFL 21 but to indicate the location of the next normal cluster #3 as shown in FIGS. 19(C) and 19(D). More specifically, if there is any defective cluster, which is registered as a defect entry 31 with the UNUSE attribute with the DFL 21, in the spare area 15, then the next available spare location information 43 may end up indicating either the defective cluster location or a normal cluster location with the defective cluster avoided in Step 906. Specifically, FIGS. 19(A) and 19(B) illustrate a state (i.e., the initial state) of the optical disc 1 that has just been subjected to the physical reformatting. FIGS. 19(C) and 19(D) illustrate a state of the optical disc 1 in which cluster #103 has been newly detected as a defective cluster while a write operation is being performed on the user data area 14 of the optical disc 1 in the state shown in FIGS. 19(A) and 19(B) and then subjected to a replacement write operation. And FIGS. 19(E) and 19(F) illustrate a state of the optical disc 1 in which cluster #105 has been newly detected as another defective cluster while a write operation is being performed on the user data area 14 of the optical disc 1 in the state shown in FIGS. 19(C) and 19(D) and then subjected to a replacement write operation.

As described above, if the next available spare location information 43 ends up indicating a normal cluster location with a defective cluster avoided, then it may be determined, in Step 903, whether the location (i.e., physical address) of the cluster following the replacement cluster that has been determined to be used matches to the sector address of a defective cluster included in the defect entry. And if these addresses are found matching to each other, then the next available spare location information 43 may be updated in Step 904 so as to indicate the cluster location after the next one with the defective cluster indicated by the defect entry avoided. On the other hand, if those addresses are found not matching to each other, then the next available spare location information 43 may be updated so as to indicate the location of a cluster following the replacement cluster that has been determined to be used.

As also described above, although a cluster managed by a defect entry 31 with the UNUSE attribute (i.e., definite spare defect attribute) is not to be used as a replacement, a cluster managed by a defect entry 31 with the SPR (RDE) attribute (i.e., provisional spare defect attribute), which may have had its defect already repaired (i.e., a cluster that may be usable but that has been provisionally regarded as defective), may or may not be used (i.e., allocated) as a replacement. That is to say, the next available spare location information 43 never points to any cluster managed by a defect entry 31 with the UNUSE attribute but may point to a cluster managed by a defect entry 31 with the SPR (RDE) attribute.

Also, when it is determined in Step 903 whether the location (i.e., the physical address) of the cluster following the replacement cluster that has been determined to be used matches to the sector address of a defective cluster included in a defect entry, it may be determined whether the physical address matches to the sector address of a defective cluster with the UNUSE attribute (i.e., a definite spare defect attribute) included in the defect entry. Also, if these addresses are found matching to each other and when the next available spare location information 43 is updated in Step 904 so as to indicate the next cluster location with the defective cluster indicated by the defect entry avoided, the next available spare location information 43 may be updated so as to indicate the cluster location after the next one with the defective cluster with the UNUSE attribute (i.e., a definite spare defect attribute) indicated by the defect entry avoided.

Alternatively, when it is determined in Step 903 whether the location (i.e., the physical address) of the cluster following the replacement cluster that has been determined to be used matches to the sector address of a defective cluster included in a defect entry, it may be determined whether the physical address matches to the sector address of a defective cluster with the SPR (RDE) attribute (i.e., a provisional spare defect attribute) included in the defect entry. Also, if these addresses are found matching to each other, the next available spare location information 43 may be updated so as to indicate a block location next to the block that has been allocated as the replacement cluster (i.e., the sector address of a defective cluster with the SPR (RDE) attribute (i.e., the provisional spare defect attribute)).

As a result of this processing, the location of such a cluster to be managed by a defect entry 31 with the SPR (RDE) attribute (i.e., the provisional spare defect attribute), which is a cluster that may have had its defect repaired (i.e., a potentially usable cluster), can be a cluster location indicated by the next available spare location information 43. That is why if a cluster managed by a defect entry 31 with the SPR (RDE) attribute is used as a replacement but has already had its defect repaired, then that cluster can be used in the replacement processing. Alternatively, that cluster managed by a defect entry 31 with the SPR (RDE) attribute may not be used as a replacement (e.g., may be either converted into a defect entry with the UNUSE attribute so as not to be used as a replacement or just skipped without being used as a replacement).

That is to say, it may be determined whether the location of a cluster indicated by the next available spare location information 43 agrees with the sector address of a defective cluster managed by a defect entry with the SPR (RDE) attribute (i.e., the provisional spare defect attribute). In this case, if these addresses are found matching to each other, then the defective cluster managed by a defect entry with the SPR (RDE) attribute (provisional spare defect attribute) and pointed to by the next available spare location information 43 may be used as a replacement cluster as it is. Alternatively, the defective cluster managed by a defect entry with the SPR (RDE) attribute (provisional spare defect attribute) and pointed to by the next available spare location information 43 may be skipped in the direction in which the spare area 15 is used and a cluster following that cluster may be allocated as a replacement cluster as well.

Embodiment 2

Hereinafter, a rewritable optical disc with three recording layers, each of which has two spare areas 15 on the inner and outer sides thereof, respectively, will be described as an information recording medium with multiple spare areas 15 according to a second specific preferred embodiment of the present invention.

1. Area Arrangement/Data Structure

Figure 12:
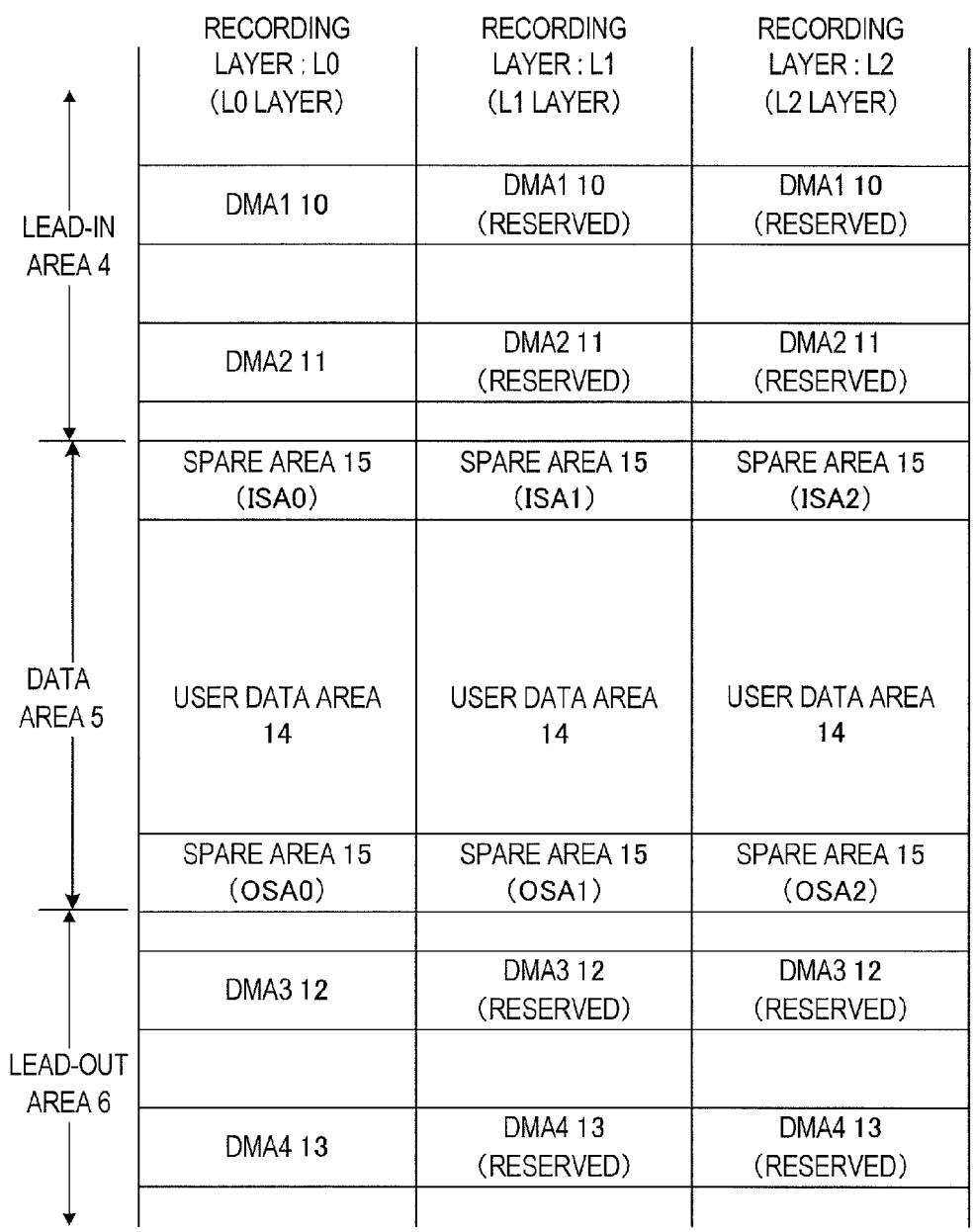
FIG. 12 illustrates the arrangement of areas and the structure of an optical disc 1 according to second and third preferred embodiments of the present invention.

FIG. 12 shows the area arrangement of a rewritable optical disc with three recording layers as a second specific preferred embodiment of the present invention.

The rewritable optical disc as the second preferred embodiment of the present invention has the same data structure as the counterpart with only one recording layer that has been described as the first preferred embodiment of the present invention except the role played by the defect management information area (DMA) on each of those recording layers, the spare areas arranged on the inner and outer sides of each of those recording layers, and the data structure of the DFL header 30. Thus, the following description of the second preferred embodiment of the present invention will be focused on their differences.

The optical disc 1 includes three recording layers, which will be identified herein by L0, L1 and L2 and will be referred to herein as "L0 layer", "L1 layer" and "L2 layer", respectively. The L0 layer is located closest to the disc substrate (not shown), i.e., located most distant from the disc surface to be irradiated with a laser beam. That is to say, the L2 layer is located closest to the disc surface irradiated with the laser beam.

The lead-in and lead-out areas 4 and 6 of each of those three recording layers have areas to write defect management information about defective blocks of the optical disc 1 on. Specifically, each lead-in area 4 has first and second defect management information areas 10 and 11 (which will be referred to herein as "DMA1" and "DMA2", respectively) and each lead-out area 6 has third and fourth defect management information areas 12 and 13 (which will be referred to herein as "DMA3" and "DMA4", respectively).

In this case, defect management information, which is management information for the optical disc 1, is managed as a single set of information about all of those recording layers and is written mostly on DMA1 through DMA4 of the L0 layer that functions as a reference layer. That is why the areas of the other non-reference recording layers (i.e., the L1 and L2 layers) that correspond to DMA1 through DMA4 of the reference layer are reserved as replacement recording areas on which the defect management information will be written when cycle deterioration happens due to overwriting, for example. In other words, as long as there is no need to perform a replacement write operation, no valid information will be written at all on DMA 1 through DMA4 of the L1 and L2 layers.

Also, each of those recording layers has spare areas 15 on the inner and outer sides thereof, which will be referred to herein as "inner spare area (ISA)" and "outer spare area (OSA)", respectively. Furthermore, to identify the spare areas 15 of the respective recording layers, the layer number (e.g., "0" for the L0 layer) is added herein as a suffix to ISA and OSA. For example, the outer spare area 15 of the L1 layer will be identified herein by "OSA1".

Each of those spare areas 15 is prepared to provide a replacement cluster for a cluster with a defective sector in the user data area 14. Although each of those spare areas 15 should be used sequentially in a predetermined direction, it can be determined quite arbitrarily which of those spare areas 15 is used to provide a replacement for a defective cluster detected. In other words, any of those spare areas 15 may be allocated as a replacement. Thus, there is no problem even if ISA0 that is a spare area 15 of the L0 layer is allocated as a replacement for a defective cluster that has been detected in the user data area 14 of the L2 layer, for example.

FIG. 13(B) illustrates the data structure of the DFL header 30.

As shown in FIG. 13(A), the optical disc that has three recording layers (i.e., L0, L1 and L2 layers) and that also has spare areas 15 on the inner and outer sides of each of those recording layers has not only a DFL identifier 40, number of times of update information 41, and the number of defect entries 42 but also pieces of next available spare location information 43 for the respective spare areas (P_ISA0, P_OSA0, P_OSA1, P_ISA1, P_ISA2 and P_OSA2) to provide information to manage a next available cluster location in each spare area.

In this preferred embodiment, the order in which the physical addresses are assigned (i.e., the track path) follows the so-called "opposite path" format, in which the direction in which the physical address increases inverts every layer. Specifically, in the example shown in FIG. 12, the physical address increases from some inner radial location toward the outer edge (which will be referred to herein as "increases outward") on the L0 layer, increases in the opposite direction from some outer radial location toward the inner edge (which will be referred to herein as "increases inward") on the L1 layer, and then increases outward again on the L2 layer as on the L0 layer.

In FIG. 13(A), the dotted arrow shown in each spare area 15 indicates the direction in which that spare area 15 is used in this second preferred embodiment of the present invention. Specifically, except OSA2 that is the outer spare area 15 of the L2 layer, every spare area 15 is used in the track path direction, i.e., in the ascending order of physical addresses. However, only OSA2, which is a spare area 15 with larger physical addresses than any other spare area 15 (and which will be referred to herein as "the last spare area"), is supposed to be used in the descending order of physical addresses.

In the second preferred embodiment of the present invention to be described below, the spare areas 15 are supposed to be used exactly as shown in FIG. 13(A).

In the second preferred embodiment of the present invention to be described below, the track path is supposed to follow the opposite path format. However, it is not always necessary to adopt this track path format. For example, the same effect will also be achieved even if a so-called "parallel path" format, in which the physical addresses are assigned in the same radial direction on every recording layer, is adopted.

2. Configuration of Optical Disc Reading/Writing Apparatus

The optical disc reading/writing apparatus 100 of this second preferred embodiment of the present invention has the same configuration as what is shown in FIG. 5 for the first preferred embodiment of the present invention, and the description thereof will be omitted herein.

3. Writing Method 3-(1) Initialization Format

The initialization formatting processing of the second preferred embodiment of the present invention is performed just as already described in 3-(1) for the first preferred embodiment of the present invention except that multiple pieces of next available spare location information 43 are provided for the multiple spare areas 15 on the optical disc 1, and the description thereof will be omitted herein.

It should be noted that each piece of next available spare location information 43 provided for its associated spare area 15 indicates the location of the first cluster of that spare area in the predetermined direction (i.e., the direction in which the spare area is used). For example, if the spare areas 15 are used in the directions indicated by the dotted arrows in FIG. 13

(i.e., if every spare area but the last one OSA2 is used in the ascending order of physical addresses and if only the last spare area OSA2 is used in the descending order of physical addresses), then each of the next available spare location information 43 (P_ISA0, P_OSA0, P_OSA1, P_ISA1 and P_ISA2) indicates a cluster location with the smallest physical address in its associated spare area 15 and only the next available spare location information 43 (P_OSA2) indicates a cluster location with the largest physical address in the outer spare area 15 (OSA2) on the L2 layer.

3-(2) Relation Between Normal Defect Replacement Writing and Defect Entry 31

The defect replacement processing to be performed according to this second preferred embodiment of the present invention on the optical disc 1 that has been subjected to initialization formatting is carried out just as already described in 3-(2) for the first preferred embodiment of the present invention except that there are multiple spare areas on the optical disc 1 to provide a replacement for a defective cluster, and a detailed description thereof will be omitted herein.

If there are multiple spare areas 15 that can provide a replacement for a defective cluster, then the replacement cluster is allocated by arbitrarily selecting one of those multiple spare areas 15.

For example, if a defective cluster has been detected in the user data area 14 of the L0 layer shown in FIG. 12, any of ISA0, OSA0, OSA1, ISA1, ISA2 and OSA2 may be used as the spare area 15 to provide a replacement cluster for the defective cluster unless that spare area 15 has already been used up (or full) or write-protected by the user. In that case, considering the amount of time (or the performance) it will take to get the replacement write operation done, the spare area 15 that is located closest to the defective cluster (which will be referred to herein as an "ideal replacement spare area") is preferably used to allocate a replacement. As used herein, the "close" spare area 15 may refer to one of the following spare areas 15:

a spare area 15 that is located on the same recording layer as the defective cluster and that provides a cluster to be used as a replacement, which is located at the shortest radial distance from the defective cluster;

a spare area 15 that is located on the same recording layer as the defective cluster and that provides a cluster to be used as a replacement, of which the physical address is least different from (i.e., closest to) that of the defective cluster; and considering that in performing a seek operation, the optical pickup 120 can be moved more quickly in a predetermined direction than in the opposite direction (specifically, a seek operation to move from some inner radial location toward the outer edge can be done more quickly than a seek operation to move from some outer radial location toward the inner edge), a spare area 15 that provides a cluster to be used as a replacement, which seems to be reached by the optical pickup 120 in the shortest time from the defective cluster while a seek operation is performed.

The time it takes to get a seek operation done can be calculated by multiplying the number of tracks between the defective cluster location and the replacement cluster location by one of two different weighting coefficients according to whether the seek operation needs to be performed outward or inward.

Furthermore, if the ideal replacement spare area that is preferably allocated to provide a replacement as described above is not available (i.e., either already used up (full) or write-protected by the user), the spare area 15 to provide a replacement may be determined on one of the following criteria:

a spare area 15 that is located on the same recording layer as the defective cluster and that is not the ideal replacement spare area; or if no spare area 15 on the same recording layer is available anymore, spare area 15 that is located on an adjacent recording layer and that provides a cluster to be used as a replacement, which is located at the shortest radial distance from the defective cluster or seems to be reached in the shortest time by the optical pickup 120 while a seek operation is performed.

And if there are two adjacent recording layers over and under the current recording layer, one of the two recording layers that is located at the shorter layer-to-layer interval from the current layer or one of the two recording layers that is located closer to the reference layer may be adopted preferentially.

Or if not one cluster but multiple clusters should be replaced at a time as will be described later for the third preferred embodiment, it would be effective to adopt preferentially a spare area 15 that can provide a series of replacement clusters continuously. Alternatively, it would also be effective to adopt a spare area 15 that can easily allocate replacement clusters in the ascending order of physical addresses so that the replacement clusters allocated can be accessed continuously.

It should be noted that the methods of determining the spare area 15 to provide a replacement described above are just examples and any one of the multiple discrete spare areas 15 may be chosen arbitrarily as described above to provide a replacement. That is to say, it is one way to allocate a spare area 15 that is located closest to the defective cluster. Alternatively, the spare areas 15 may also be used in the ascending order of the physical addresses of clusters (i.e., in the order of ISA0, OSA0, OSA1, ISA1, ISA2 and OSA2).

3-(3) How to Allocate Replacement Clusters (During Physical Reformatting)

According to this second preferred embodiment of the present invention, replacement clusters are allocated during physical reformatting just as already described in 3-(3) for the first preferred embodiment of the present invention except the processing step 901 of determining the spare area 15 to provide a replacement. Thus, the following description will be focused on only that difference.

In Step 901, a spare area 15 to provide a replacement is determined. Specifically, the replacement location calculating section 174 calculates a spare area 15 that can be allocated to provide a replacement. In this case, if there is only one spare area 15 that can provide a replacement, the spare area 15 to use can be determined automatically as already described for the first preferred embodiment of the present invention. However, if there are multiple spare areas 15 that can provide a replacement, one of those spare areas 15 needs to be chosen and adopted by the same method (or idea) as what has already been described in 3-(2) for this second preferred embodiment of the present invention. That is to say, at this point in time, the spare area 15 to use is chosen by determining whether the spare area 15 has been used up (full) or not.

3-(4) How to Allocate Replacement Clusters (During Normal Writing)

According to this second preferred embodiment of the present invention, while a write operation is being performed on the user data area 14 of the optical disc 1 that has already been subjected to physical reformatting, a defective cluster is detected and a replacement cluster is allocated to it just as already described in 3-(4) for the first preferred embodiment of the present invention except the processing step 901 of determining the spare area 15 to provide a replacement as in 3-(3) just described. And that processing step 901 of determining the spare area 15 to provide a replacement is also just as already described in 3-(2) for the second preferred embodiment of the present invention. Thus, the description thereof will be omitted herein.

That is to say, in the recording method and apparatus of this preferred embodiment, a replacement cluster in a spare area is allocated by reference to next available spare location information 43 and a defect entry 31 and then the next available spare location information 43 is updated as in the first preferred embodiment described above.

On the other hand, in the reproducing method and apparatus of this preferred embodiment, when user data is read, a replacement cluster that has been allocated by the recording method or apparatus described above is scanned instead of a defective cluster, thereby retrieving the necessary information as in the first preferred embodiment described above.

As described above, even if there are multiple spare areas 15 that can provide a replacement, every bit of the processing can also get done in basically the same way as in a situation where there is only one spare area 15 except that the processing step of deciding which of those spare areas 15 needs to be used should be performed.

Embodiment 3

Hereinafter, a rewritable optical disc with three recording layers, each of which has two spare areas 15 on the inner and outer sides thereof, respectively, as in the second preferred embodiment of the present invention will be described as an information recording medium according to a third specific preferred embodiment of the present invention.

1. Area Arrangement/Data Structure

The rewritable optical disc as the third preferred embodiment of the present invention has the same area arrangement as the second preferred embodiment of the present invention that has been described with reference to FIG. 12 and the description thereof will be omitted herein.

In the rewritable optical disc as the third preferred embodiment of the present invention, however, the contents (attributes) of each defect entry 31 on the DFL 21 include not only the ones that have already been described for the first and second preferred embodiments of the present invention but also some additional attributes.

FIGS. 14(A) and 14(B) show exemplary statuses that the second status field 31c of each defect entry 31 can assume according to this third preferred embodiment of the present invention and some typical combinations of the first and second status fields 31a and 31c.

As shown in FIG. 14(A), the value of the second status field 31c can be not only 0000 indicating that this field is not used and 0100 (RDE status) indicating that the cluster indicated by the first or second address field 31b or 31d has been subjected to the physical reformatting (to be described later) and may have had its defect repaired and that there is no significant user data in either a defective cluster or a replacement cluster but also 0001 and 0010 respectively indicating the first and last clusters of a continuous defective area. These statuses are indicated to cope with a situation where replacement clusters have been allocated to defective clusters that have the RAD0 attribute, for example, and also have continuous physical addresses, and are called "CRD (continuous RAD)". More specifically, if a replacement write operation has been performed with three consecutive clusters #1, #2 and #3 in the spare area 15 allocated as replacement clusters to three consecutive clusters with physical addresses #101, #102 and #103 in the user data area 14, the respective first ones of the defective and replacement clusters (i.e., #101 and #1) are registered as a defect entry 31 indicating CRD0 (top), of which the first and second status fields 31a and 31c are 0000 and 0001, respectively. On the other hand, the respective last ones of the defective and replacement clusters (i.e., #103 and #3) are registered as a defect entry 31 indicating CRD0 (end), of which the first and second status fields 31a and 31c are 0000 and 0010, respectively. In this manner, consecutive defective clusters that cover a number of clusters can be managed. Since a series of defective clusters can be managed collectively as described above, the size of the DFL 21 can be reduced.

As used herein, the "consecutive clusters (with a series of physical addresses)" refer to clusters, which are continuous with each other in the direction in which the physical address increases. That is to say, if the clusters #3, #2 and #1 in the spare area 15 have been respectively allocated as replacement clusters to the three consecutive clusters with physical addresses #101, #102 and #103 in the user data area 14, then the former set of clusters will not be referred to herein as "consecutive clusters". In that case, those defective clusters will not be managed by defect entries 31 for managing consecutive defective clusters, of which the second status fields 31c are 0001 and 0010, respectively. More specifically, if any of ISA0, OSA0, OSA1, ISA1 and ISA2, which are spare areas 15 to be used in the ascending order of physical addresses, is allocated to provide replacements for a series of defective clusters in the user data area 14 that are continuous with each other in the ascending order of physical addresses, a defect entry 31 with the CRD attribute is generated easily. However, if OSA2, which is a spare area 15 to be used in the descending order of physical addresses, is allocated to provide replacements for such a series of defective clusters in the user data area 14, no defect entry 31 with the CRD attribute will be generated if a replacement cluster is determined on a cluster-by-cluster basis.

Likewise, if the clusters #2 and #4 to provide replacements have turned out to be defective ones and therefore clusters #1, #3 and #5 in the spare area 15 have been allocated as replacement clusters to the three consecutive clusters with physical addresses #101, #102 and #103, respectively, in the user data area 14, the former set of three clusters will not be referred to herein as "consecutive clusters", either. In that case, those defective clusters will not be managed by defect entries 31 for managing consecutive defective clusters, of which the second status fields 31c are 0001 and 0010, respectively.

As shown in FIG. 14, only the RAD0 attribute, of which the first status field 31a is 0000, and the RAD1 attribute, of which the first status field 31a is 1000, can have the defect entries 31, of which the second status fields 31c are 0001 and 0010, respectively.

It should be noted that the values of the second status field 31c and the combinations of the first and second status fields 31a and 31c shown in FIG. 14 are only examples and do not always have to be used according to the present invention. Thus, naturally the same effect will be achieved even by providing defect entries 31, of which the second status fields 31c are 0001 and 0010, for the NRD attribute, for example.

As described above, even if consecutive replacement clusters have been allocated to consecutive defective clusters, the defect entries 31, of which the second status fields 31c are 0001 and 0010, do not always have to be used but every defective cluster may be registered with the DFL 21 using the RAD0 attribute that supposes to manage defective clusters on a cluster by cluster basis as already described for the first and second preferred embodiments of the present invention. Even so, the defective clusters and replacement clusters can also be managed as a DFL 21 with no problem, although the number of defect entries 31 to be registered with the DFL 21 will somewhat increase in that case.

2. Configuration of Optical Disc Reading/Writing Apparatus

The optical disc reading/writing apparatus 100 of this third preferred embodiment of the present invention has the same configuration as what is shown in FIG. 5 for the first preferred embodiment of the present invention, and the description thereof will be omitted herein.

3. Writing Method 3-(1) Initialization Format

The initialization formatting processing of the third preferred embodiment of the present invention is performed just as already described in 3-(1) for the second preferred embodiment of the present invention, and the description thereof will be omitted herein.

3-(2) Relation Between Normal Defect Replacement Writing and Defect Entry 31

The defect replacement processing to be performed according to this third preferred embodiment of the present invention on the optical disc 1 that has been subjected to initialization formatting is carried out just as already described in 3-(2) for the second preferred embodiment of the present invention, and the description thereof will be omitted herein.

Although not described in detail, if a replacement write operation has been performed on a series of consecutive defective clusters that have been detected in the user data area 14 by allocating a series of consecutive clusters in the spare area 15 to them, those defective clusters can be registered with the DFL 21 as defect entries 31 with the CRD0 attribute, of which the first status field 31*a* is 0000 and the second status fields 31*c* are 0001 and 0010, respectively, which is a difference from the second preferred embodiment of the present invention.

3-(3) How to Allocate Replacement Cluster (During Physical Reformatting)

3-(4) How to Allocate Replacement Cluster (During Normal Writing)

According to this third preferred embodiment of the present invention, while physical reformatting is carried out and while a write operation is being performed on the user data area 14 of the optical disc 1 that has been subjected to the physical reformatting, defective clusters are detected and replacement clusters are allocated to them just as already described in 3-(3) and 3-(4) for the second preferred embodiment of the present invention except that the decisions are made in the processing steps 901 through 906 shown in FIG. 9 from an additional standpoint. And the following description will be focused on only that difference.

In Step 901, a spare area 15 to provide a replacement is determined. Specifically, the replacement location calculating section 174 calculates a spare area 15 that can be allocated to provide a replacement. In this case, if there is only one spare area 15 that can provide a replacement, the spare area 15 to use can be determined automatically as already described for the first preferred embodiment of the present invention. However, if there are multiple spare areas 15 that can provide a replacement, one of those spare areas 15 needs to be chosen and adopted by the same method (or idea) as what has already been described in 3-(2) for the second preferred embodiment of the present invention. That is to say, at this point in time, the spare area 15 to use is chosen by determining whether the spare area 15 has been used up (full) or not.

In this processing step, the number N of consecutive clusters to be allocated as replacement clusters (where N is a positive number that is equal to or greater than one) is also taken into account. That is to say, if replacement clusters are allocated to a series of N defective clusters, the spare area 15 to use may be determined on the following conditions with that number N of consecutive clusters taken into account:

a spare area 15, from which a series of N clusters that begins with the cluster pointed to by the next available spare location information 43 can be allocated, is adopted preferentially. That is to say, in the spare area 15 preferred, those N consecutive clusters, beginning with the cluster pointed to by the next available spare location information 43, do not include any defective cluster, of which the defect entry 31 is registered with the DFL 21;

a spare area 15, of which the clusters are used in the ascending order of physical addresses, is adopted preferentially; or unless the series of N clusters cannot be allocated as replacement clusters from any of the spare areas 15, a spare area 15, from which a larger number of clusters can be allocated than any other spare area 15, is given a top priority.

It should be noted that these conditions are just examples and do not always have to be satisfied. Or it is not always necessary to impose these conditions in determining the spare area 15 to use.

Step 902 is performed in the same way as Step 902 that has already been described in 3-(3) for the first preferred embodiment of the present invention.

Step 903 is performed in the same way as Step 903 that has already been described in 3-(3) for the first preferred embodiment of the present invention.

In these processing steps, with a situation where multiple clusters need to be allocated consecutively as replacement clusters taken into account, the replacement location calculating section 174 determines how many clusters can be allocated consecutively from the cluster location indicated by the next available spare location information 43. Specifically, if replacement clusters need to be allocated to a series of N defective clusters, the replacement location calculating section 174 sees if a series of N clusters that begins with the cluster location indicated by the next available spare location information 43 includes any cluster that is registered as a defective cluster with the DFL 21 and whether the end of that spare area 15 is exceeded or not, thereby determining the number of clusters that can be allocated consecutively that is at most equal to N.

Step 904 is performed in the same way as Step 904 that has already been described in 3-(3) for the first preferred embodiment of the present invention.

Next, in Step 905, the cluster pointed to by the next available spare location information 43 is defined to be the replacement cluster. Specifically, the replacement location calculating section 174 defines the cluster pointed to by the next available spare location information 43 to be the replacement cluster, and also defines the number of clusters that can be allocated consecutively as determined in the processing step 903 just described to be the number of consecutive clusters to allocate.

Finally, in Step 906, the next available spare location information 43 is updated. Specifically, the replacement location calculating section 174 gets the next available spare location information 43 updated by the management information updating section 175 so that the information 43 indicates the cluster location next to the replacement clusters allocated. More specifically, if it has been determined in the previous processing step 905 that a number of clusters be allocated consecutively as replacement clusters, the next available spare location information 43 is updated so as to indicate a cluster location that follows the consecutive clusters to allocate.

By performing these processing steps, the spare area 15 to provide replacements and replacement clusters are determined. The procedure described above is applicable to allocating replacement clusters both during the physical reformatting and during normal defect replacement processing alike.

Hereinafter, an example of the processing of this preferred embodiment will be described with reference to FIGS. 15(A) through 15(D). The spare area 15 to use is defined to be ISA0 in Step 901.

Figure 15:
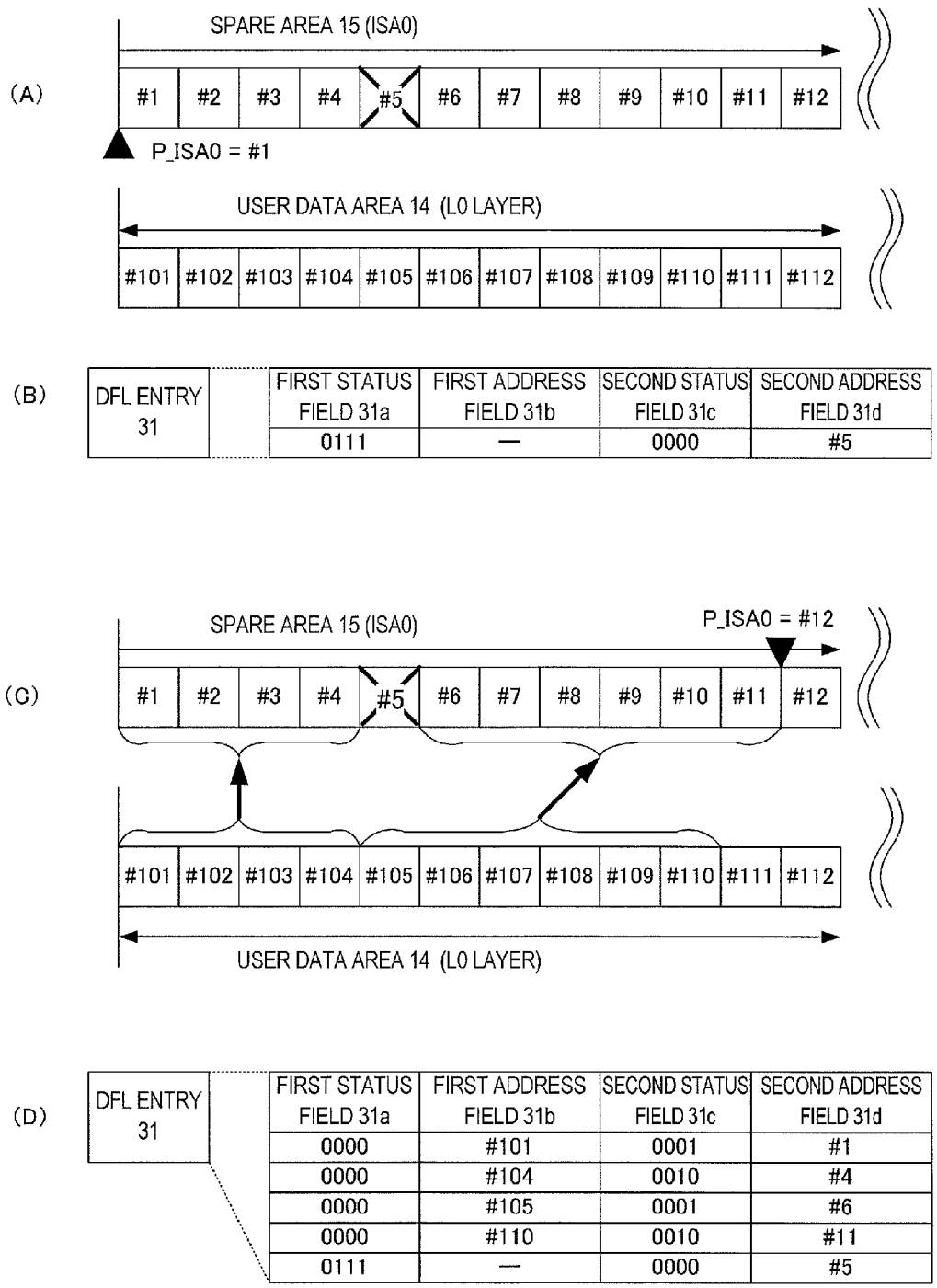
FIGS. 15(A) through 15(D) illustrate specifically how to allocate replacements according to the third preferred embodiment of the present invention.
Figure 16:
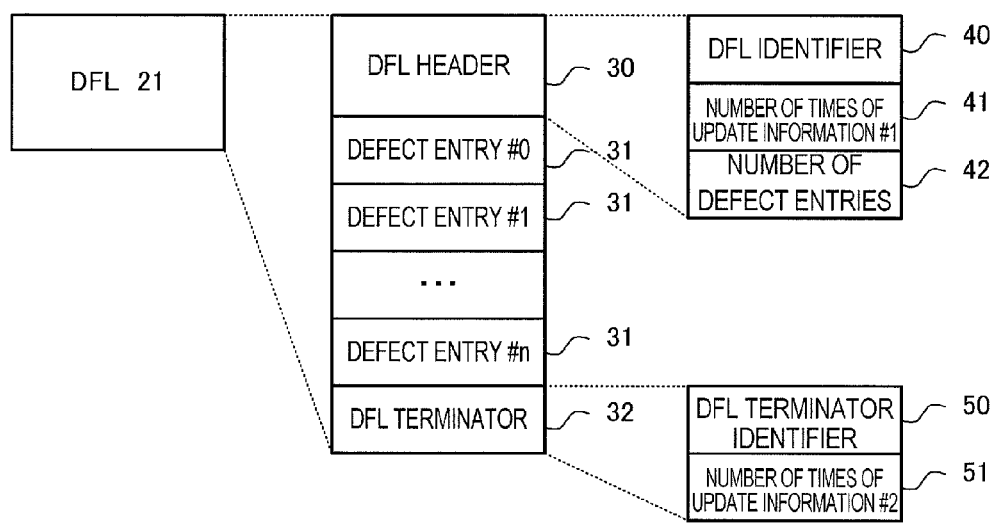
FIG. 16 shows the contents of data included in a DFL 21.

FIGS. 15(A) and 15(B) illustrate a state (i.e., the initial state) of the optical disc 1 before replacements are allocated. The cluster #5 in the spare area 15 to provide a replacement is registered as a defective cluster (with the UNUSE attribute) with the DFL 21. Meanwhile, the next available spare location information 43 points to cluster #1.

Suppose in the optical disc 1 in such a state, ten clusters #101 through #110 in the user data area 14 have been detected as consecutive defective clusters. FIGS. 15(C) and 15(D) illustrate a state of the optical disc 1 in which replacement clusters have been allocated to those ten consecutive defective clusters.

Ideally, ten consecutive clusters should be allocated as replacement clusters. However, this spare area 15 to provide replacement clusters includes the defective cluster #5 in the series of ten consecutive clusters that begins with cluster #1 pointed to by the next available spare location information 43. In that case, the consecutive defective clusters are replaced with two split sets of clusters. Specifically, first, the first four clusters that can allocate replacements consecutively are registered as a defect entry 31 with the CRD0 attribute with the DFL 21. Next, replacement clusters for the remaining six defective clusters are allocated consecutively from the first normal cluster #6 that follows the defective cluster #5, and those six replacement clusters are registered as a defect entry 31 with the CRD0 attribute with the DFL 21. That is to say, the four consecutive defective clusters #101 through #104 in the user data area 14 are replaced consecutively with the clusters #1 through #4 in the spare area 15 and then the six consecutive defective clusters #105 through #110 in the user data area 14 are replaced consecutively with the clusters #6 through #11 in the spare area 15. Consequently, the defect entries 31 registered with the DFL 21 include: a defect entry 31 with the CRD0 (top) attribute, of which the first status, first address, second status and second address fields 31a, 31b, 31c and 31d are 0000, #101, 0001 and #1, respectively; a defect entry 31 with the CRD0 (end) attribute, of which the first status, first address, second status and second address fields 31a, 31b, 31c and 31d are 0000, #104, 0010 and #4, respectively; a defect entry 31 with the CRD0 (top) attribute, of which the first status, first address, second status and second address fields 31a, 31b, 31c and 31d are 0000, #105, 0001 and #6, respectively; and a defect entry 31 with the CRD0 (end) attribute, of which the first status, first address, second status and second address fields 31a, 31b, 31c and 31d are 0000, #110, 0010 and #11, respectively.

In the example described above, ISA0 is supposed to be chosen as the spare area 15 to provide replacements for convenience sake. However, if there is any other spare area that can provide replacements consecutively, then that spare area 15 may be naturally used to provide replacements so that ten consecutive replacement clusters are allocated to #101 through #110, respectively.

As described above, in the recording method and apparatus of this preferred embodiment, a replacement cluster in a spare area is allocated by reference to next available spare location information 43 and a defect entry 31 and then the next available spare location information 43 is updated as in the first and second preferred embodiments described above.

On the other hand, in the reproducing method and apparatus of this preferred embodiment, when user data is read, a replacement cluster that has been allocated by the recording method or apparatus described above is scanned instead of a defective cluster, thereby retrieving the necessary information as in the first and second preferred embodiments described above.

Figure 1:
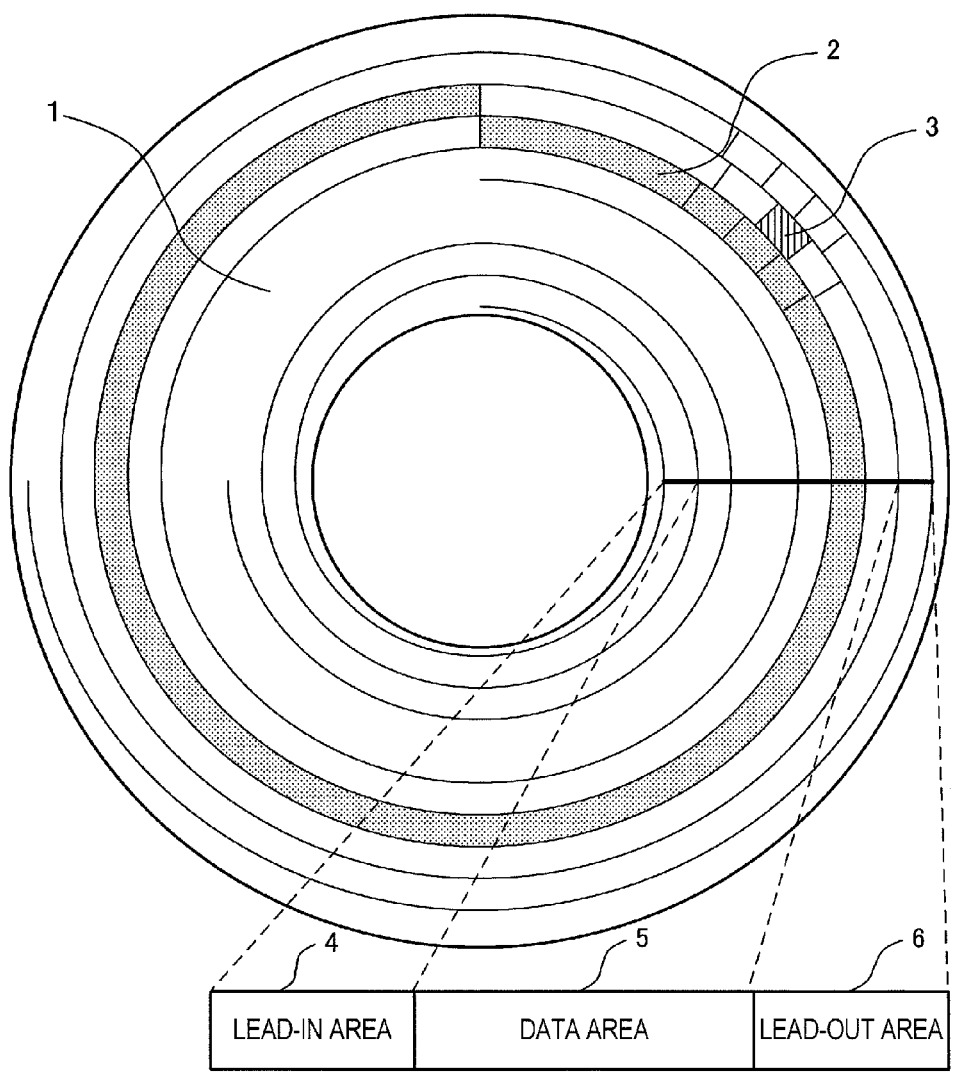
FIG. 1 illustrates the physical structure of an optical disc.
Figure 20:
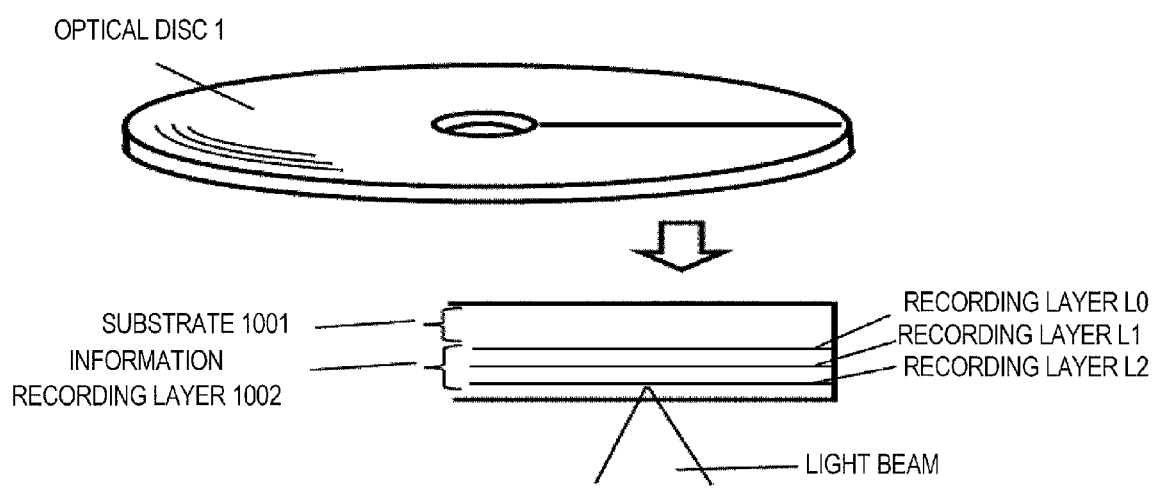
FIG. 20 illustrates a cross section of a multilayer optical disc as a preferred embodiment of the present invention.

Hereinafter, it will be described how to make the optical disc 1. FIG. 20 illustrates a multilayer optical disc 1 with three recording layers as an example. The optical disc 1 has information recording layers 1002 consisting of recording layers L0, L1 and L2, which are stacked one upon the other in this order on a substrate 1001 so that the L0 layer is located most distant from the disc surface irradiated with an incoming light beam. This optical disc 1 may be made in the following manner. Specifically, first, those recording layers L0, L1 and L2 with tracks on which an information signal is written based on an address signal or control data are formed in this order on the disc substrate 1001. As a result, recording layers, in each of which the user data area, defect management areas and spare areas are arranged as shown in FIGS. 1 and 2, are obtained. Optionally, a spacer layer may be inserted between the recording layers. If necessary, those recording layers may be coated with a cover layer.

The attributes of the defect entries 31 (or the types of the defect entries 31 to be managed by the first and second status fields 31a and 31c) as described for the first, second and third preferred embodiments of the present invention are only examples. Specifically, in the foregoing description of preferred embodiments, a defective cluster in a spare area 15 is supposed to be managed by a defect entry 31 with either the UNUSE attribute or SPR (RDE) attribute on a cluster-by-cluster basis. However, there may be an attribute that has the same meaning as those attributes but that is supposed to be managed on the basis of multiple clusters just like the CRD attribute. Or there may be another attribute that has a different meaning from the UNUSE attribute or the SPR (RDE) attribute and that is provided to manage a defective cluster in the spare area 15 by physical reformatting. Even so, such attributes may be treated just like the defect entries 31 with the UNUSE or SPR (RDE) attribute as already described for the first, second and third preferred embodiments of the present invention. Then, the same effects as what has already been described will naturally be achieved.

In the first, second and third preferred embodiments of the present invention described above, a rewritable optical disc may sometimes have a physical reformatting function that allows for changing the sizes (i.e., increasing or decreasing the size) of a predetermined spare area 15 (such as the last spare area). That is why if a spare area 15 that has been used up is subjected to processing of increasing its size, then that spare area 15 is no longer exhausted (or full). In that case, the information about the exhausted state of the spare area 15 that has already been described in 3-(3) for the first preferred embodiment of the present invention should be updated. For example, if the next available spare location information 43 has a predetermined value indicating the exhausted state (such as a hexadecimal number FFFFFFFF or all zero data), then the next available spare location information may be updated so as to indicate the next actually available cluster location in the spare area 15. Or if the next available spare location information 43 has such a piece of information as a spare exhaustion flag, then that flag should be changed (or cleared) so as to indicate that the spare area is not actually exhausted. On the other hand, if the exhausted state is represented by indicating a location that is adjacent to, but outside of, the spare area 15 (e.g., a cluster location in the user data area 14 and as for the next available spare location information 43 (P_OSA2) for the last spare area OSA2 shown in FIG. 13, the last cluster location on the outermost periphery in the user data area 14 on the L2 layer), there is no need to update the next available spare location information 43, in particular, even if the sizes of the spare area 15 have been changed.

Also, in the first, second and third preferred embodiments of the present invention described above, information such as the next available spare location information 43 is supposed to be updated by directly changing the values of the data corresponding to the DFL 21 in the management information storage memory 160. However, the next available spare location information 43 could naturally be once retrieved into a memory 150, which separately stores, as internal variables, required information to get the optical disc 1 loaded, and then the values of the internal variables could be reflected on the next available spare location information 43 in the management information storage memory 160 before a write operation is performed on the DMA.

Furthermore, in the first, second and third preferred embodiments of the present invention described above, defect types (or attributes) in defect entries 31 have been described. However, the values and numbers of bits in the first and second status fields 31a and 31c mentioned above are just examples and may also be any other values as long as the respective attributes are distinguished from each other.

Furthermore, in the first, second and third preferred embodiments of the present invention described above, the direction in which the spare area 15 is used is indicated only as an example. Alternatively, the spare area 15 may also be used in any other direction as long as the clusters in each spare area 15 are used in a predetermined order.

Furthermore, in the first, second and third preferred embodiments of the present invention described above, the defect entries 31 indicating a defective cluster in the spare area 15 are supposed to have two attributes (i.e., UNUSE and SPR (RDDE)), of which the first status fields 31a have two different values (i.e., 0111 and 0010) and the second status fields 31c have the same value 0100. However, it is not always necessary to use those attributes as long as the state of the spare area 15 can be determined to be either a normal defective state or the RDE state. That is to say, a defective cluster in the spare area 15 can also be managed in the same way even by defect entries with the UNUSE and UNUSE (RDE) attributes, of which the first status fields 31a have the same UNUSE attribute (0111) but the second status fields 31c have two states (0000 and 0100 (RDE)).

As described above, an information recording medium according to the present invention is a rewritable information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a spare defect attribute indicating the location of the defective block, if any, in the spare area; a defect entry specifying the sector address of the defective block; and next available spare location information for use to manage a location in the spare area from which a next replacement block is available.

In one preferred embodiment, the at least one spare area of the information recording medium includes multiple spare areas, and the defect management information includes the next available spare location information that is defined for each of those multiple spare areas.

In another preferred embodiment, the spare defect attribute includes at least one of: a definite spare defect attribute indicating that the defective block in the spare area is definitely unusable; and a provisional spare defect attribute indicating that the defective block in the spare area used to be a defective one but may have had its defect repaired by now.

An information recording method according to the present invention is a method for writing information on a rewritable information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a spare defect attribute indicating the location of the defective block, if any, in the spare area; a defect entry specifying the sector address of the defective block; and next available spare location information for use to manage a location in the spare area from which a next replacement block is available. The recording method includes the steps of: allocating a replacement block to the defective block by reference to the next available spare location information and the defect entry; and updating the next available spare location information.

In one preferred embodiment, the recording method includes, if the replacement block has been allocated, the steps of: (a) determining whether or not the location of the next block that follows the replacement block allocated matches to the sector address specified by the defect entry; if the answer to the step (a) is NO, then (b) updating the next available spare location information so that the information indicates the location of that next block; but if the answer to the step (a) is YES, then (c) updating the next available spare location information so that the information indicates the location of a block that follows that next one in the predetermined direction with the defective block indicated by the defect entry avoided.

In this particular preferred embodiment, the spare defect attribute includes at least one of: a definite spare defect attribute indicating that the defective block in the spare area is definitely unusable; and a provisional spare defect attribute indicating that the defective block in the spare area used to be a defective one but may have had its defect repaired by now. The step (a) includes determining whether or not the location of the next block matches to the sector address of the defective block having the definite spare defect attribute. If the answer to the step (a) is YES, the step (c) includes updating the next available spare location information so that the information indicates the location of a block that follows that next one in the predetermined direction with the defective block having the definite spare defect attribute avoided.

In still another preferred embodiment, the spare defect attribute includes a provisional spare defect attribute indicating that the defective block in the spare area used to be a defective one but may have had its defect repaired by now. The recording method includes the steps of: (a) determining whether or not the location of the next block that follows the replacement block allocated matches to the sector address of the defective block having the provisional spare defect attribute; and if the answer to the step (a) is YES, then (b) updating the next available spare location information so that the information indicates the location of that next block.

In yet another preferred embodiment, the spare defect attribute includes a provisional spare defect attribute indicating that the defective block in the spare area used to be a defective one but may have had its defect repaired by now. If it has turned out, while the replacement block is being allocated, that the location of the block indicated by the next available spare location information does not match to the sector address specified by the defect entry, the block pointed to by the next available spare location information is allocated as the replacement block. But if it has turned out, while the replacement block is being allocated, that the location of the block indicated by the next available spare location information matches to the sector address managed by the provisional spare defect attribute, then performed is one of the steps of: (a) allocating the block managed by the provisional spare defect attribute as the replacement block; and (b) allocating a next block, which is determined by skipping that block managed by the provisional spare defect attribute in the predetermined direction, as the replacement block.

In yet another preferred embodiment, the recording method includes, if the replacement block is allocated, the steps of: (a) determining whether or not the location indicated by the next available spare location information provided matches to the sector address specified by the defect entry; if the answer to the step (a) is NO, then (b) determining the block pointed to by the next available spare location information to be the replacement block, but if the answer to the step (a) is YES, then (c) avoiding the defective block indicated by the defect entry and determining the next block that follows the defective block in the predetermined direction to be the replacement block. And the method further includes the step of (d) updating, if necessary, the next available spare location information so that the information indicates the location of a block that follows the block that has been determined to be the replacement block in either the step (b) or (c).

In this particular preferred embodiment, the at least one spare area of the information recording medium includes multiple spare areas. The defect management information includes the next available spare location information that is defined for each of those multiple spare areas. The step (a) includes the steps of: choosing one of the multiple spare areas that needs to be used to allocate the replacement block; and determining whether or not the next available spare location information provided for that spare area chosen matches to the sector address specified by the defect entry.

In an alternative preferred embodiment, the step (a) includes the steps of: deciding the defect entry, to which the next available spare location information needs to be compared, to see if the entry matches to the information; and if the answer is YES, then updating the defect entry, to which the next available spare location information needs to be compared to see if they match, into a next defect entry.

In still another preferred embodiment, the spare defect attribute includes: a definite spare defect attribute indicating that the defective block in the spare area is definitely unusable; and a provisional spare defect attribute indicating that the defective block in the spare area used to be a defective one but may have had its defect repaired by now. The step (a) includes the steps of: deleting the defect entry having the provisional spare defect attribute if the defect entry specifies the same sector address as the one indicated by the next available spare location information; and determining whether or not the location indicated by the next available spare location information matches to the sector address specified by the defect entry having the definite spare defect attribute.

An information recording apparatus according to the present invention is an apparatus for writing information on a rewritable information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a spare defect attribute indicating the location of the defective block, if any, in the spare area; a defect entry specifying the sector address of the defective block; and next available spare location information for use to manage a location in the spare area from which a next replacement block is available. The information recording apparatus allocates a replacement block to the defective block by reference to the next available spare location information and the defect entry and updates the next available spare location information.

In one preferred embodiment, if the replacement block has been allocated, the recording apparatus determines whether or not the location of the next block that follows the replacement block allocated matches to the sector address specified by the defect entry. If the apparatus has decided that the location does not match to the sector address, the apparatus updates the next available spare location information so that the information indicates the location of that next block. But if the apparatus has decided that the location does match to the sector address, then the apparatus updates the next available spare location information so that the information indicates the location of a block that follows that next one in the predetermined direction with the defective block indicated by the defect entry avoided.

In this particular preferred embodiment, the spare defect attribute includes at least one of: a definite spare defect attribute indicating that the defective block in the spare area is definitely unusable; and a provisional spare defect attribute indicating that the defective block in the spare area used to be a defective one but may have had its defect repaired by now. The recording apparatus determines whether or not the location of the next block that follows the block allocated as the replacement block matches to the sector address of the defective block having the definite spare defect attribute. If the apparatus has decided that the location matches to the sector address, the apparatus updates the next available spare location information so that the information indicates the location of a block that follows that next one in the predetermined direction with the defective block having the definite spare defect attribute avoided.

In another preferred embodiment, the spare defect attribute includes a provisional spare defect attribute indicating that the defective block in the spare area used to be a defective one but may have had its defect repaired by now. The recording apparatus determines whether or not the location of the next block that follows the replacement block allocated matches to the sector address of the defective block having the provisional spare defect attribute. If the apparatus has decided that the location does match to the sector address, then the apparatus updates the next available spare location information so that the information indicates the location of that next block that follows the block allocated as the replacement block.

In still another preferred embodiment, the spare defect attribute includes a provisional spare defect attribute indicating that the defective block in the spare area used to be a defective one but may have had its defect repaired by now. If the recording apparatus has found, while allocating the replacement block, that the location of the block indicated by the next available spare location information does not match to the sector address specified by the defect entry, the apparatus allocates the block pointed to by the next available spare location information as the replacement block. But if the apparatus has found, while allocating the replacement block, that the location of the block indicated by the next available spare location information matches to the sector address managed by the provisional spare defect attribute, then the apparatus allocates the replacement block by either (a) allocating the block managed by the provisional spare defect attribute as the replacement block, or (b) allocating a next block, which is determined by skipping that block managed by the provisional spare defect attribute in the predetermined direction, as the replacement block.

In yet another preferred embodiment, the recording apparatus includes: a decision section for deciding, to allocate the replacement block, whether or not the location indicated by the next available spare location information provided matches to the sector address specified by the defect entry; and a determining section that determines, if the decision section has found the location and the sector address not matching to each other, the block pointed to by the next available spare location information to be the replacement block. If the decision section has found the information and the sector address matching to each other, the determining section determines the next block that follows, in the predetermined direction, the defective block indicated by the defect entry to be the replacement block. The recording apparatus further comprises an updating section for updating, if necessary, the next available spare location information so that the information indicates the location of the next block that follows the one determined to be the replacement block by the determining section.

In this particular preferred embodiment, the at least one spare area of the information recording medium includes multiple spare areas. The defect management information includes the next available spare location information that is defined for each of those multiple spare areas. The decision section chooses one of the multiple spare areas that needs to be used to allocate the replacement block and determines whether or not the next available spare location information provided for that spare area chosen matches to the sector address specified by the defect entry.

In another preferred embodiment, the decision section decides the defect entry, to which the next available spare location information needs to be compared, to see if the entry matches to the information. If the decision section has found the entry and the information matching, then the decision section updates the defect entry, to which the next available spare location information needs to be compared to see if they match, into a next defect entry.

In this particular preferred embodiment, the spare defect attribute includes: a definite spare defect attribute indicating that the defective block in the spare area is definitely unusable; and a provisional spare defect attribute indicating that the defective block in the spare area used to be a defective one but may have had its defect repaired by now. The decision section deletes the defect entry having the provisional spare defect attribute if the defect entry specifies the same sector address as the one indicated by the next available spare location information, and determines whether or not the location indicated by the next available spare location information matches to the sector address specified by the defect entry having the definite spare defect attribute.

An information reproducing method according to the present invention is a method for reading information from an information recording medium on which the information has been written by the information recording method of the present invention described above. The information is retrieved by scanning the replacement block allocated.

An information reproducing apparatus according to the present invention is an apparatus for reading information from an information recording medium on which the information has been written by the information recording apparatus of the present invention described above. The information is retrieved by scanning the replacement block allocated.

Another information recording method according to the present invention is a method for writing information on a rewritable information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a defect entry specifying the sector address of the defective block; and next available spare location information for use to manage a location in the spare area from which a next replacement block is available. The information recording method includes the steps of: (a) scanning the user data area for any defective block; (b) scanning the spare area for any defective block; (c) allocating a replacement block to the defective block that has been detected in the step (a) so that the defective block detected in the step (b) is avoided and that blocks of the spare area are sequentially used in a predetermined direction on a first come, first use basis; (d) adding a defect entry, including the sector address of the defective block that has been detected in the step (a), to the defect management information; (e) updating the next available spare location information so that the information indicates the location of the next block that follows the replacement block allocated in the step (c); and (f) writing the defect management information that has been updated in the steps (d) and (e) on the defect management information area.

In one preferred embodiment, the at least one spare area of the information recording medium includes multiple spare areas. The defect management information provides spare area used location information for each of those spare areas. The step (c) includes choosing one of the spare areas that is going to be used to allocate the replacement block. The step (e) includes updating the next available spare location information for the spare area chosen so that the information indicates the location of the next block that follows the replacement block allocated in the step (c).

Another information recording apparatus according to the present invention is an apparatus for writing information on a rewritable information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a defect entry specifying the sector address of the defective block; and next available spare location information for use to manage a location in the spare area from which a next replacement block is available. The information recording apparatus includes: a user data area defective block detecting section for scanning the user data area for any defective block; a spare area defective block detecting section for scanning the spare area for any defective block; a replacement block calculating section for allocating a replacement block to the defective block that has been detected in the user data area so that the defective block detected in the spare area is avoided and that blocks of the spare area are sequentially used in a predetermined direction on a first come, first use basis and for adding a defect entry, specifying the sector address of the defective block that has been detected in the user data area, to the defect management information; a next available spare location information updating section for updating the next available spare location information so that the information indicates the location of the next block that follows the replacement block allocated; and a management information writing section for writing the defect management information that has been updated by the replacement block calculating section and the next available spare location information updating section on the defect management information area.

In one preferred embodiment, the at least one spare area of the information recording medium includes multiple spare areas. The defect management information provides spare area used location information for each of those spare areas. The replacement block calculating section chooses one of the spare areas that is going to be used to allocate the replacement block, and the next available spare location information updating section updates the next available spare location information for the spare area chosen so that the information indicates the location of the next block that follows the replacement block allocated.

Another information recording medium according to the present invention is an information recording medium on which information is written by the information recording method of the present invention described above. The recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a defect entry specifying the sector address of the defective block; and next available spare location information for use to manage a location in the spare area from which a next replacement block is available. The defect management information updated is written on the defect management information area.

An information reproducing method according to the present invention is a method for reading information from an information recording medium on which the information has been written by the information recording method of the present invention described above. The information is retrieved by scanning the replacement block allocated.

An information reproducing apparatus according to the present invention is an apparatus for reading information from an information recording medium on which the information has been written by the information recording apparatus of the present invention described above. The information is retrieved by scanning the replacement block allocated.

As also described above, an information recording medium according to the present invention is an information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes a defect entry including a spare defect attribute, indicating that there is a defective block in the spare area, and the sector address of the defective block, and next available spare location information for use to manage a location in the spare area from which a next replacement block is available, whereby the object described above is achieved.

The at least one spare area of the information recording medium may include multiple spare areas, and the defect management information may provide the next available spare location information for each of those multiple spare areas.

The spare defect attribute may further include: a definite spare defect attribute indicating that the defective block in the spare area is definitely unusable; and a provisional spare defect attribute indicating that the defective block in the spare area used to be a defective one but may have had its defect repaired by now.

An information recording method according to the present invention is a method for writing information on an information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes a defect entry including a spare defect attribute, indicating that there is a defective block in the spare area, and the sector address of the defective block, and next available spare location information for use to manage a location in the spare area from which a next replacement block is available. If the replacement block is allocated, the recording method includes the steps of: (a) determining whether or not the location indicated by the next available spare location information matches to the sector address specified by the defect entry; if the answer to the step (a) is NO, then (b) determining the block pointed to by the next available spare location information to be the replacement block; but if the answer to the step (a) is YES, then (c) avoiding the defective block indicated by the defect entry and determining the next block that follows the defective block in the predetermined direction to be the replacement block; and (d) updating the next available spare location information so that the information indicates a next block location that follows the replacement block that has been determined in the step (b) or (c), whereby the object described above is achieved.

The step (a) may include: (a-1) an initializing step for deciding what defect entry needs to be compared to the next available spare location information to determine if the entry and the information match to each other; and (a-2) an updating step for advancing to the next defect entry that needs to be compared if the entry and the information have turned out to match to each other.

The spare defect attribute may further include: a definite spare defect attribute indicating that the defective block in the spare area is definitely unusable; and a provisional spare defect attribute indicating that the defective block in the spare area used to be a defective one but may have had its defect repaired by now. The step (a) may include the steps of: (a-3) deleting the defect entry having the provisional spare defect attribute if the defect entry specifies the same sector address as the one indicated by the next available spare location information; and (a-4) determining whether or not the location indicated by the next available spare location information matches to the sector address specified by the defect entry having the definite spare defect attribute.

The at least one spare area of the information recording medium may include multiple spare areas. The defect management information may provide the next available spare location information for each of those spare areas. The step (a) may include the steps of: (a-5) choosing one of the spare areas that needs to provide the replacement block; and (a-6) determining whether or not the location indicated by the next available spare location information for the spare area that has been chosen in the step (a-5) matches to the sector address specified by the defect entry.

An information recording method according to the present invention is a method for writing information on an information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a defect entry specifying the sector address of the defective block; and next available spare location information for use to manage a location in the spare area from which a next replacement block is available. The information recording method includes the steps of: (a) scanning the user data area for any defective block; (b) scanning the spare area for any defective block; (c) allocating a replacement block to the defective block that has been detected in the step (a) so that the defective block detected in the step (b) is avoided and that blocks of the spare area are sequentially used in a predetermined direction on a first come, first use basis and adding a defect entry, including the sector address of the defective block that has been detected in the step (a), to the defect management information; (d) updating the next available spare location information so that the information indicates the location of the next block that follows the replacement block allocated in the step (c); and (e) writing the defect management information that has been updated in the steps (c) and (d) on the defect management information area, whereby the object described above is achieved.

The at least one spare area of the information recording medium may include multiple spare areas. The defect management information may provide the spare area used location information for each of those spare areas. The step (c) may include the steps of: (c-1) choosing one of the spare areas that needs to provide the replacement block; and (c-2) allocating a replacement block to the defective block that has been detected in the step (a) so that the defective block detected in the step (b) is avoided and that blocks of the spare area chosen in the step (c-1) are sequentially used in a predetermined direction on a first come, first use basis and adding a defect entry, including the sector address of the defective block that has been detected in the step (a), to the defect management information. The step (d) may include the step of (d-1) updating the next available spare location information for the spare area chosen in the step (c-1) so that the information indicates the location of the next block that follows the replacement block allocated in the step (c-2).

An information recording apparatus according to the present invention is an apparatus for writing information on an information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a defect entry including a spare defect attribute, indicating that there is a defective block in the spare area, and the sector address of the defective block; and next available spare location information for use to manage a location in the spare area from which a next replacement block is available. The recording apparatus includes: a decision section for deciding, to allocate the replacement block, whether or not the location indicated by the next available spare location information provided matches to the sector address specified by the defect entry; a first replacement block determining section that determines, if the decision section has found the location and the sector address not matching to each other, the block pointed to by the next available spare location information to be the replacement block; a second replacement block determining section that determines, if the decision section has found the location and the sector address matching to each other, the next block that follows, in the predetermined direction, the defective block indicated by the defect entry to be the replacement block; and an updating section for updating the next available spare location information so that the information indicates the next block location that follows the replacement block determined by the first or second replacement block determining section, whereby the object described above is achieved.

The decision section may include: an initializing section for deciding what defect entry needs to be compared to the next available spare location information to determine if the entry and the information match to each other; and a comparative entry updating section for advancing to the next defect entry that needs to be compared if the entry and the information have turned out to match to each other.

The spare defect attribute may further include: a definite spare defect attribute indicating that the defective block in the spare area is definitely unusable; and a provisional spare defect attribute indicating that the defective block in the spare area used to be a defective one but may have had its defect repaired by now. The decision section may include: a defect entry deleting section for deleting the defect entry having the provisional spare defect attribute if the defect entry specifies the same sector address as the one indicated by the next available spare location information; and a first decision section for determining whether or not the location indicated by the next available spare location information matches to the sector address specified by the defect entry having the definite spare defect attribute.

The at least one spare area of the information recording medium may include multiple spare areas. The defect management information may provide the next available spare location information for each of those spare areas. The decision section may include: a spare area choosing section for choosing one of the spare areas that needs to provide the replacement block; and a second decision section for determining whether or not location indicated by the next available spare location information for the spare area that has been chosen by the spare area choosing section matches to the sector address specified by the defect entry.

Another information recording apparatus according to the present invention is an apparatus for writing information on an information recording medium on which a read/write operation is performed on a block-by-block basis. The information recording medium includes: a user data area to store user data written thereon; at least one spare area including a replacement block that would replace any defective block in the user data area; and a defect management information area to store defect management information for use to manage the defective block in the user data area or the spare area. The spare area is used sequentially in a predetermined direction. The defect management information includes: a defect entry specifying the sector address of the defective block; and next available spare location information for use to manage a location in the spare area from which a next replacement block is available. The information recording apparatus includes: a user data area defective block detecting section for scanning the user data area for any defective block; a spare area defective block detecting section for scanning the spare area for any defective block; a replacement block calculating section for allocating a replacement block to the defective block that has been detected by the user data area defective block detecting section so that the defective block detected by the spare area defective block detecting section is avoided and that blocks of the spare area are sequentially used in a predetermined direction on a first come, first use basis and for adding a defect entry, including the sector address of the defective block that has been detected by the user data area defective block detecting section, to the defect management information; a next available spare location information updating section for updating the next available spare location information so that the information indicates the location of the next block that follows the replacement block allocated by the replacement block calculating section; and a management information writing section for writing the defect management information that has been updated by the replacement block calculating section and the next available spare location information updating section on the defect management information area, whereby the object described above is achieved.

The at least one spare area of the information recording medium may include multiple spare areas. The defect management information may provide the spare area used location information for each of those spare areas. The replacement block calculating section may include: a spare area choosing section for choosing one of the spare areas that needs to provide the replacement block; and a first replacement block calculating section for allocating a replacement block to the defective block that has been detected by the user data area defective block detecting section so that the defective block detected by the spare area defective block detecting section is avoided and that blocks of the spare area chosen by the spare area choosing section are sequentially used in a predetermined direction on a first come, first use basis and adding a defect entry, including the sector address of the defective block that has been detected by the user data area defective block detecting section, to the defect management information. The next available spare location information updating section may update the next available spare location information for the spare area chosen by the spare area choosing section so that the information indicates the location of the next block that follows the replacement block allocated by the first replacement block calculating section.

The information reading/writing method of the present invention is applicable to an optical disc drive that can perform a read/write operation on a rewritable optical disc with a defect management function, for example.

What is claimed is:

1. A method for writing information on a rewritable information recording medium on which a read/write operation is performed on a block-by-block basis,
   wherein the information recording medium includes:
   a user data area to store user data written thereon;
   a spare area including a replacement block that would replace a defective block in the user data area; and
   a defect management information area to store defect management information for use to manage the defective block in the user data area or the spare area, and
   wherein the spare area is used sequentially in a predetermined direction, and
   wherein the defect management information includes:
   a spare defect attribute indicating the defective block, if any, in the spare area;
   a defect entry specifying the sector address of the defective block; and
   next available spare location information for use to manage a location in the spare area from which a next replacement block is available, and
   wherein the method comprises the steps of:
   allocating a replacement block to the defective block by reference to the next available spare location information and the defect entry; and
   updating the next available spare location information,
   wherein the spare defect attribute includes a provisional spare defect attribute indicating that the defective block in the spare area used to be a defective one but may have had its defect repaired by now, and
   wherein if it has turned out, while the replacement block is being allocated, that the location of the block indicated by the next available spare location information does not match to the sector address specified by the defect entry, the block pointed to by the next available spare location information is allocated as the replacement block, but
   if it has turned out, while the replacement block is being allocated, that the location of the block indicated by the next available spare location information matches to the sector address managed by the provisional spare defect attribute, then performed is one of the steps of:
   (a) allocating the block managed by the provisional spare defect attribute as the replacement block; and
   (b) allocating a next block, which is determined by skipping that block managed by the provisional spare defect attribute in the predetermined direction, as the replacement block.

2. A method for reading information from an information recording medium on which the information has been written by the method of claim 1,
   wherein the information is retrieved by scanning the replacement block allocated.

3. A information recording medium on which the information is written by the method of claim 1,
   the information recording medium comprising:
   a user data area to store user data written thereon;

a spare area including a replacement block that would replace a defective block in the user data area; and a defect management information area to store defect management information for use to manage the defective block in the user data area or the spare area.

4. An information writing apparatus for writing information on a rewritable information recording medium on which a read/write operation is performed on a block-by-block basis, wherein the information recording medium includes:

a user data area to store user data written thereon;

a spare area including a replacement block that would replace a defective block in the user data area; and a defect management information area to store defect management information for use to manage the defective block in the user data area or the spare area, and wherein the spare area is used sequentially in a predetermined direction, and wherein the defect management information includes:

a spare defect attribute indicating the defective block, if any, in the spare area;

a defect entry specifying the sector address of the defective block; and next available spare location information for use to manage a location in the spare area from which a next replacement block is available, and wherein the information writing apparatus allocates a replacement block to the defective block by reference to the next available spare location information and the defect entry and updates the next available spare location information, wherein the spare defect attribute includes a provisional spare defect attribute indicating that the defective block in the spare area used to be a defective one but may have had its defect repaired by now, and wherein if the writing apparatus has found, while allocating the replacement block, that the location of the block indicated by the next available spare location information does not match to the sector address specified by the defect entry, the apparatus allocates the block pointed to by the next available spare location information as the replacement block, but if the apparatus has found, while allocating the replacement block, that the location of the block indicated by the next available spare location information matches to the sector address managed by the provisional spare defect attribute, then the apparatus allocates the replacement block by either (a) allocating the block managed by the provisional spare defect attribute as the replacement block, or (b) allocating a next block, which is determined by skipping that block managed by the provisional spare defect attribute in the predetermined direction, as the replacement block.

5. An apparatus for reading information from an information recording medium on which the information has been written by the apparatus of claim 4, wherein the information is retrieved by scanning the replacement block allocated.

* * * * *